US011823421B2

(12) United States Patent
Iiola et al.

(10) Patent No.: US 11,823,421 B2
(45) Date of Patent: Nov. 21, 2023

(54) SIGNALLING OF METADATA FOR VOLUMETRIC VIDEO

(71) Applicant: Nokia Technologies Oy, Espoo (FI)

(72) Inventors: Lauri Iiola, Tampere (FI); Kimmo Roimela, Tampere (FI); Vinod Kumar Malamal Vadakital, Tampere (FI); Jaakko Keränen, Helsinki (FI); Mika Pesonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 158 days.

(21) Appl. No.: 16/815,976

(22) Filed: Mar. 11, 2020

(65) Prior Publication Data
US 2020/0294271 A1   Sep. 17, 2020

Related U.S. Application Data

(60) Provisional application No. 62/818,268, filed on Mar. 14, 2019.

(51) Int. Cl.
*G06T 9/00* (2006.01)
*G06T 3/40* (2006.01)
(Continued)

(52) U.S. Cl.
CPC ............ *G06T 9/001* (2013.01); *G06T 3/40* (2013.01); *G06T 15/08* (2013.01); *G06T 17/10* (2013.01); *G06T 17/20* (2013.01)

(58) Field of Classification Search
None
See application file for complete search history.

(56) References Cited

U.S. PATENT DOCUMENTS

2003/0063223 A1*  4/2003  Ojo .................... H04N 19/503
                                                     348/700
2006/0204115 A1*  9/2006  Burazerovic ........ H04N 19/115
                                                     382/239
(Continued)

FOREIGN PATENT DOCUMENTS

EP          3 349 182 A1      7/2018

OTHER PUBLICATIONS

Extended European Search Report for European Application No. 20162570.4 dated Jul. 16, 2020, 9 pages.
(Continued)

*Primary Examiner* — Sultana M Zalalee
(74) *Attorney, Agent, or Firm* — ALSTON & BIRD LLP

(57) ABSTRACT

A method, apparatus, and computer program product provide for compression of volumetric video in a manner that is more efficient and requires less metadata updates. A method can include converting a volumetric video scene into a canonical representation comprising a plurality of frames comprising a video atlas and corresponding metadata. Each frame can be divided into a plurality of tiles based on different tile characteristics, which can be used to analyze and characterize the different tiles for atlas packing purposes. Tiles can be clipped or merged or otherwise edited in the atlas. Tiles can be decomposed to metadata suitable for later rendering of the tile. Tiles having a similar enough color attribute or depth attribute during the entire group of photos can be rendered as a single instance, clipped entirely, and rendered based upon a reference tile and the stored metadata.

17 Claims, 10 Drawing Sheets
(5 of 10 Drawing Sheet(s) Filed in Color)

(51) Int. Cl.
*G06T 15/08* (2011.01)
*G06T 17/10* (2006.01)
*G06T 17/20* (2006.01)

(56) References Cited

U.S. PATENT DOCUMENTS

| | | | | |
|---|---|---|---|---|
| 2008/0304744 | A1* | 12/2008 | Peters | G06T 7/12 |
| | | | | 382/173 |
| 2009/0161751 | A1* | 6/2009 | Belyaev | H04N 19/61 |
| | | | | 375/E7.1 |
| 2012/0307887 | A1* | 12/2012 | Concion | H04N 19/136 |
| | | | | 375/E7.126 |
| 2014/0334717 | A1* | 11/2014 | Jiang | G06T 15/04 |
| | | | | 382/154 |
| 2014/0354641 | A1* | 12/2014 | Flordal | G06T 9/00 |
| | | | | 345/422 |
| 2015/0043807 | A1* | 2/2015 | Aliseychik | H04N 19/12 |
| | | | | 382/154 |
| 2015/0269258 | A1* | 9/2015 | Hunt, Jr. | G06V 20/52 |
| | | | | 707/770 |
| 2015/0379684 | A1* | 12/2015 | Ramani | G06T 11/40 |
| | | | | 345/531 |
| 2016/0055663 | A1* | 2/2016 | Sandholm | G06T 3/4038 |
| | | | | 345/473 |
| 2016/0170564 | A1* | 6/2016 | Masuda | H04N 9/3194 |
| | | | | 345/175 |
| 2016/0212405 | A1* | 7/2016 | Zhang | H04N 19/167 |
| 2017/0099602 | A1* | 4/2017 | Joo | H04W 12/084 |
| 2018/0007364 | A1* | 1/2018 | Noraz | H04N 19/182 |
| 2018/0033185 | A1* | 2/2018 | Sakurai | G06T 15/04 |
| 2018/0144535 | A1* | 5/2018 | Ford | G06T 15/04 |
| 2018/0150696 | A1* | 5/2018 | Li | G06V 10/507 |
| 2018/0293778 | A1* | 10/2018 | Appu | G06T 9/00 |
| 2019/0087979 | A1* | 3/2019 | Mammou | G06T 9/004 |
| 2019/0108639 | A1* | 4/2019 | Tchapmi | G06T 7/143 |
| 2019/0197739 | A1* | 6/2019 | Sinharoy | G06T 9/00 |
| 2019/0268601 | A1* | 8/2019 | Lu | H04N 19/105 |
| 2019/0371051 | A1* | 12/2019 | Dore | G06T 7/90 |
| 2019/0378333 | A1* | 12/2019 | Castaneda | G06K 9/00369 |
| 2020/0014940 | A1* | 1/2020 | Dawar | G06T 9/001 |
| 2020/0043217 | A1* | 2/2020 | Cilingir | G06T 15/005 |
| 2020/0105023 | A1* | 4/2020 | Graziosi | G06T 9/001 |
| 2020/0204864 | A1* | 6/2020 | Aggarwal | H04N 21/4854 |
| 2020/0286283 | A1* | 9/2020 | Takahashi | G06T 19/003 |
| 2021/0084368 | A1* | 3/2021 | Dabbiru | G11B 27/34 |
| 2021/0183109 | A1* | 6/2021 | Chevet | H04N 19/597 |
| 2021/0195162 | A1* | 6/2021 | Chupeau | H04N 21/21805 |
| 2021/0203989 | A1* | 7/2021 | Wang | G06T 9/00 |
| 2021/0385423 | A1* | 12/2021 | Oh | H04N 19/597 |

OTHER PUBLICATIONS

Wong, A. et al., *Adaptive Mulitiple Texture Approach to Texture Packing for 3D Video Games*, FuturePlay ACM (Nov. 14, 2007) 189-196.

Office Action for European Application No. 20162570.4 dated Mar. 9, 2023, 5 pages.

Ilola et al., "On Atlas Packing in MIV", International Organisation for Standardisation, ISO/IEC JTC1/SC29/WG11, Coding of Moving Pictures and Audio, (Jan. 2020), 2 pages.

Graziosi, D., "PCC CE2.18-Related New Contribution—Decoupled Geometry/Texture Packing", MPEG Meeting, Motion Picture Expert Group or ISO/IEC JTC1/SC29/WG11 No. m44907, (Oct. 4, 2018), 8 pages.

* cited by examiner

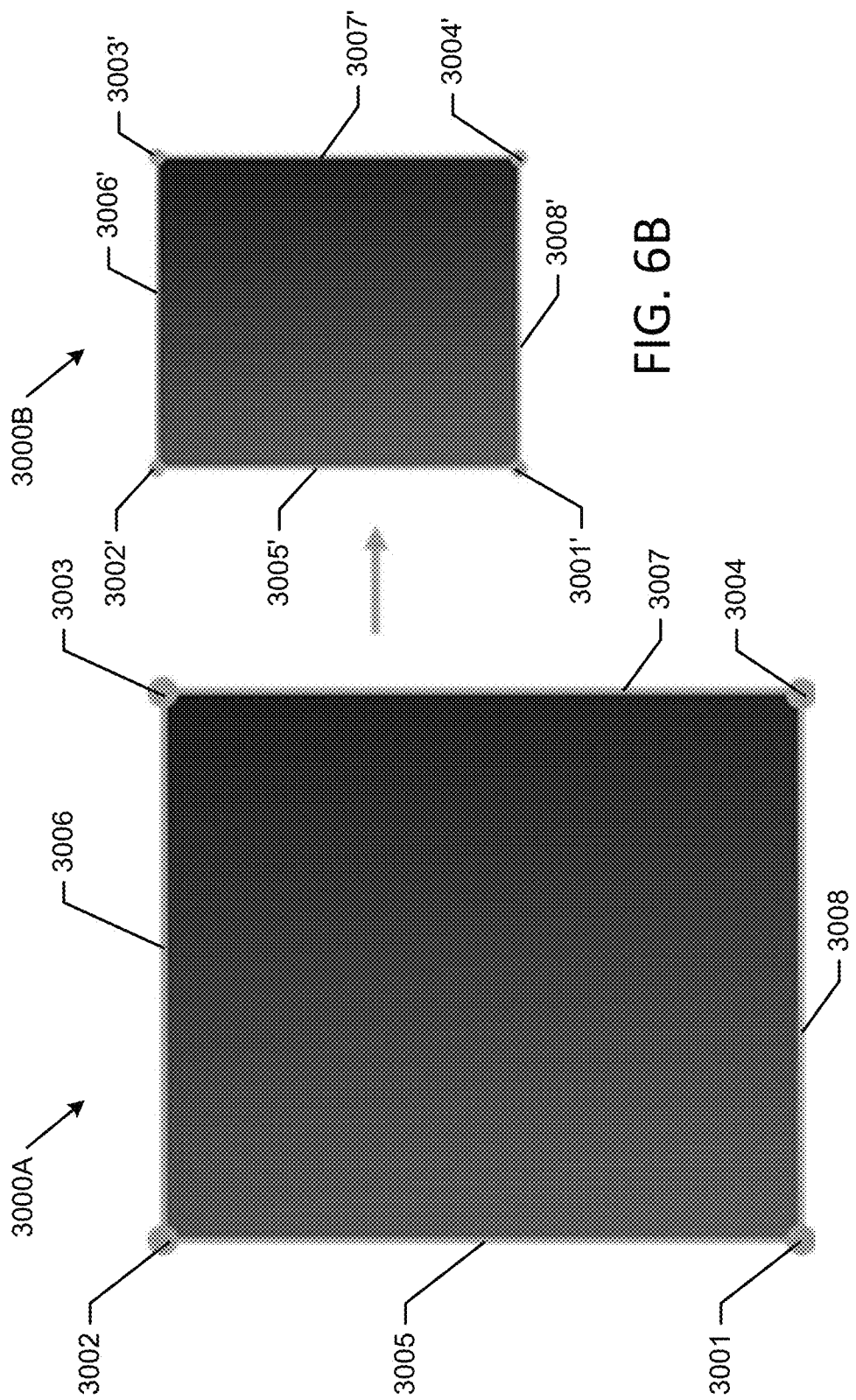

SIGNALLING OF METADATA FOR VOLUMETRIC VIDEO

CROSS-REFERENCE TO RELATED APPLICATIONS

This application claims priority to and the benefit of U.S. Provisional Patent Application No. 62/818,268, filed Mar. 14, 2019, entitled "Signalling of Metadata for Volumetric Video," the entire contents of which are hereby incorporated herein by reference in their entirety for all purposes.

TECHNOLOGICAL FIELD

An example embodiment relates generally to video compression and, more particularly, to volumetric video compression.

BACKGROUND

In the field of volumetric video compression and 3 degrees-of-freedom and greater (3DoF+) video, a character or a scene captured with a set of depth cameras or synthetically modelled and animated as a three dimensional (3D) scene, can be encoded as a volumetric video. Volumetric video compression typically segments the 3D content into a set of two dimensional (2D) tiles or tiles containing color and geometry data, which can then be compressed using a standard 2D video compression format. Thus, color and geometry data can be considered as components of volumetric video. Volumetric video compression is currently typically being explored and standardized in the MPEG-I Point Cloud Compression (PCC) and 3DoF+ efforts, for example.

BRIEF SUMMARY

A method, apparatus, and computer program product are provided in accordance with an example embodiment to compress volumetric video data and to signal of associated metadata packed according to various packing methods. In some embodiments, a method can include separating one or more layouts based on a type for a plurality of volumetric video component atlases. In some embodiments, the method can include determining one or more atlas characteristics of each of one or more volumetric video component atlases of the plurality of volumetric video component atlases. In some embodiments, the method can include causing storage of information indicative of the one or more atlas characteristics of at least one volumetric video component atlas of the plurality of volumetric video component atlases as corresponding metadata. In some embodiments, the method can include determining one or more suitable packing strategies from among a plurality of packing strategies based on the one or more atlas characteristics. In some embodiments, the method can include converting, at a specified internal processing resolution, a volumetric video scene into a three dimensional (3D) sample of a scene geometry. In some embodiments, the method can include voxelizing a mesh model of a volumetric video and down-sampling a high resolution canonical representation. In some embodiments, the method can include providing a canonical representation comprising one of a point cloud, a voxelized mesh model, a 360-video, a face-vertex mesh, a winged-edge mesh, a half-edge mesh, a quad-edge mesh, a corner-table mesh, and a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, and a material attribute of the volumetric video scene.

In some embodiments, an apparatus can include at least one processor and at least one memory including computer program code for one or more programs. In some embodiments, the at least one memory and the computer program code can be configured to, with the at least one processor, cause the apparatus at least to separate one or more layouts based on a type for a plurality of volumetric video component atlases. In some embodiments, the at least one memory and the computer program code can be configured to, with the at least one processor, cause the apparatus at least to determine one or more atlas characteristics of each of one or more volumetric video component atlases of the plurality of volumetric video component atlases. In some embodiments, the at least one memory and the computer program code can be configured to, with the at least one processor, cause the apparatus at least to cause storage of information indicative of the one or more atlas characteristics of at least one volumetric video component atlas of the plurality of volumetric video component atlases as corresponding metadata. In some embodiments, the at least one memory and the computer program code can be configured to, with the at least one processor, cause the apparatus at least to determine one or more suitable packing strategies from among a plurality of packing strategies based on the one or more atlas characteristics.

In some embodiments, an apparatus can include means, such as processing circuitry and/or a memory device, for determining one or more atlas characteristics of each of one or more volumetric video component atlases of the plurality of volumetric video component atlases. In some embodiments, an apparatus can include means for causing storage of information indicative of the one or more atlas characteristics of at least one volumetric video component atlas of the plurality of volumetric video component atlases as corresponding metadata. In some embodiments, an apparatus can include means for determining one or more suitable packing strategies from among a plurality of packing strategies based on the one or more atlas characteristics. In some embodiments, an apparatus can include means for converting, at a specified internal processing resolution, a volumetric video scene into a three dimensional (3D) sample of a scene geometry. In some embodiments, the method can include voxelizing a mesh model of a volumetric video and down-sampling a high resolution canonical representation. In some embodiments, an apparatus can include means for providing a canonical representation comprising one of a point cloud, a voxelized mesh model, a 360-video, a face-vertex mesh, a winged-edge mesh, a half-edge mesh, a quad-edge mesh, a corner-table mesh, and a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, and a material attribute of the volumetric video scene.

In some embodiments, a computer program product can include at least one non-transitory computer-readable storage medium having computer executable program code instructions stored therein. In some embodiments, the computer executable program code instructions can include program code instructions configured, upon execution, to at least separate one or more layouts based on a type for a plurality of volumetric video component atlases. In some embodiments, the computer executable program code instructions can include program code instructions configured, upon execution, to determine one or more atlas characteristics of each of one or more volumetric video component atlases of the plurality of volumetric video component atlases. In some embodiments, the computer executable program code instructions can include program code instructions configured, upon execution, to cause storage of information indicative of the one or more atlas characteristics of at least one volumetric video component atlas of the plurality of volumetric video component atlases as corresponding metadata. In some embodiments, the computer executable program code instructions can include program code instructions configured, upon execution, to determine one or more suitable packing strategies from among a plurality of packing strategies based on the one or more atlas characteristics.

In some embodiments, a method can include converting a volumetric video scene into a canonical representation. In some embodiments, the method can further include processing each frame of a plurality of frames of the canonical representation to yield a video atlas and corresponding metadata for the plurality of frames. In some embodiments, the method can further include determining, for a plurality of tiles of each frame of the plurality of frames, one or more tile characteristics. In some embodiments, the method can further include structuring the corresponding metadata to include information indicative of the one or more tile characteristics. In some embodiments, the method can further include altering the video atlas to facilitate an efficient packing strategy.

In some embodiments, an apparatus can include at least one processor and at least one memory including computer program code for one or more programs. In some embodiments, the at least one memory and the computer program code configured to, with the at least one processor, cause the apparatus at least to convert a volumetric video scene into a canonical representation. In some embodiments, the at least one memory and the computer program code configured to, with the at least one processor, cause the apparatus at least to process each frame of a plurality of frames of the canonical representation to yield a video atlas and corresponding metadata for the plurality of frames. In some embodiments, the at least one memory and the computer program code configured to, with the at least one processor, cause the apparatus at least to determine, for a plurality of tiles of each frame of the plurality of frames, one or more tile characteristics. In some embodiments, the at least one memory and the computer program code configured to, with the at least one processor, cause the apparatus at least to structure the corresponding metadata to include information indicative of the one or more tile characteristics. In some embodiments, the at least one memory and the computer program code configured to, with the at least one processor, cause the apparatus at least to alter the video atlas to facilitate an efficient packing strategy.

In some embodiments, an apparatus can include means, such as processing circuitry and/or a memory device, for converting a volumetric video scene into a canonical representation. In some embodiments, an apparatus can include means for processing each frame of a plurality of frames of the canonical representation to yield a video atlas and corresponding metadata for the plurality of frames. In some embodiments, an apparatus can include means for determining, for a plurality of tiles of each frame of the plurality of frames, one or more tile characteristics. In some embodiments, an apparatus can include means for structuring the corresponding metadata to include information indicative of the one or more tile characteristics. In some embodiments, an apparatus can include means for altering the video atlas to facilitate an efficient packing strategy.

In some embodiments, a computer program product can include at least one non-transitory computer-readable storage medium having computer executable program code instructions stored therein. In some embodiments, the computer executable program code instructions can include program code instructions configured, upon execution, to convert a volumetric video scene into a canonical representation. In some embodiments, the computer executable program code instructions can include program code instructions configured, upon execution, to process each frame of a plurality of frames of the canonical representation to yield a video atlas and corresponding metadata for the plurality of frames. In some embodiments, the computer executable program code instructions can include program code instructions configured, upon execution, to determine, for a plurality of tiles of each frame of the plurality of frames, one or more tile characteristics. In some embodiments, the computer executable program code instructions can include program code instructions configured, upon execution, to structure the corresponding metadata to include information indicative of the one or more tile characteristics. In some embodiments, the computer executable program code instructions can include program code instructions configured, upon execution, to alter the video atlas to facilitate an efficient packing strategy.

In some embodiments, a method for compression of a volumetric video scene can include converting the volumetric video scene into a canonical representation, and processing separately each frame of a plurality of frames of the canonical representation to yield for each frame a video atlas and corresponding metadata. In some embodiments, the method for compression of the volumetric video scene can further include analyzing a plurality of tiles of each frame of the plurality of frames to identify two or more tiles having a tile characteristic that has a difference value that satisfies, such as by being below, a predetermined threshold and replacing the two or more tiles with static characteristic values in the corresponding metadata. In some embodiments, the method for compression of the volumetric video scene can further include, after amending the corresponding metadata, causing storage of the video atlas and the corresponding metadata separately as a video stream and a metadata stream, respectively and converting, at a specified internal processing resolution, each frame of the video stream into a 3D sample of a scene geometry. In some embodiments, the converting includes one of voxelizing a mesh model and down-sampling a high resolution point cloud. In some embodiments, the canonical representation can include a point cloud, a voxelized mesh model, a 360-video, a face-vertex mesh, a winged-edge mesh, a half-edge mesh, a quad-edge mesh, a corner-table mesh, or a vertex-vertex mesh. In some embodiments, the tile characteristic can be one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like.

In some embodiments, an apparatus for compression of a volumetric video scene can include at least one processor and at least one memory including computer program code for one or more programs. In some embodiments, the at least one memory and the computer program code can be configured to, with the at least one processor, cause the apparatus at least to convert the volumetric video scene into a canonical representation. In some embodiments, the at least one memory and the computer program code can be configured to, with the at least one processor, further cause the apparatus at least to process separately each frame of a plurality of frames of the canonical representation to yield for each frame a video atlas and corresponding metadata. In some embodiments, the at least one memory and the computer program code can be configured to, with the at least one processor, further cause the apparatus at least to analyze a plurality of tiles of each frame of the plurality of frames to identify two or more tiles having a tile characteristic that has a difference value that satisfies, such as by being below, a predetermined threshold. In some embodiments, the at least one memory and the computer program code can be configured to, with the at least one processor, further cause the apparatus at least to replace the two or more tiles with static characteristic values in the corresponding metadata. In some embodiments, the at least one memory and the computer program code can be configured to, with the at least one processor, further cause the apparatus at least to cause storage of the video atlas and the corresponding metadata separately as a video stream and a metadata stream, respectively. In some embodiments, the at least one memory and the computer program code can be configured to, with the at least one processor, further cause the apparatus at least to convert, at a specified internal processing resolution, each frame of the video stream into a 3D sample of a scene geometry.

In some embodiments, an apparatus for compression of a volumetric video scene can include means for converting the volumetric video scene into a canonical representation. In some embodiments, the apparatus can include means for processing separately each frame of a plurality of frames of the canonical representation to yield for each frame a video atlas and corresponding metadata. In some embodiments, the apparatus can include means for analyzing a plurality of tiles of each frame of the plurality of frames to identify two or more tiles having a tile characteristic that has a difference value that satisfies, such as by being below, a predetermined threshold. In some embodiments, the apparatus can include means for replacing the two or more tiles with static characteristic values in the corresponding metadata. In some embodiments, the apparatus can include means for causing storage of the video atlas and the corresponding metadata separately as a video stream and a metadata stream, respectively. In some embodiments, the apparatus can include means for converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions including program code instructions can be configured, upon execution, to convert the volumetric video scene into a canonical representation. In some embodiments, the at least one memory and the computer program code can be configured to, with the at least one processor, further cause the apparatus at least to process separately each frame of a plurality of frames of the canonical representation to yield for each frame a video atlas and corresponding metadata. In some embodiments, the at least one memory and the computer program code can be configured to, with the at least one processor, further cause the apparatus at least to analyze a plurality of tiles of each frame of the plurality of frames to identify two or more tiles having a tile characteristic that has a difference value that satisfies, such as by being below, a predetermined threshold. In some embodiments, the at least one memory and the computer program code can be configured to, with the at least one processor, further cause the apparatus at least to replace the two or more tiles with static characteristic values in the corresponding metadata. In some embodiments, the at least one memory and the computer program code can be configured to, with the at least one processor, further cause the apparatus at least to cause storage of the video atlas and the corresponding metadata separately as a video stream and a metadata stream, respectively. In some embodiments, the at least one memory and the computer program code can be configured to, with the at least one processor, further cause the apparatus at least to convert, at a specified internal processing resolution, each frame of the video stream into a 3D sample of a scene geometry.

In some embodiments, a method for compression of a volumetric video scene can include converting the volumetric video scene into a canonical representation, processing separately each frame of a plurality of frames of the canonical representation to yield for each frame a video atlas and corresponding metadata, and analyzing a plurality of tiles of each frame of the plurality of frames to identify two or more tiles having a tile characteristic that has a difference value that satisfies, such as by being below, a predetermined threshold. In some embodiments, the method can further include determining whether at least some of the two or more tiles can be merged to reduce the number of different tiles. In some embodiments, in an instance in which it is determined that at least two of the two or more tiles can be merged, the method can further include clipping at least a first tile from the video atlas and resetting the tile offsets for a second tile such that the reset tile offsets for the second tile correspond to a portion of the frame occupied by the first tile and the second tile. In some embodiments, the method can further include causing storage of the video atlas and the corresponding metadata separately as a video stream and a metadata stream, respectively and converting, at a specified internal processing resolution, each frame of the video stream into a 3D sample of a scene geometry.

In some embodiments, an apparatus for compression of a volumetric video scene can include at least one processor and at least one memory including computer program code for one or more programs. In some embodiments, the at least one memory and the computer program code can be configured to, with the at least one processor, cause the apparatus at least to convert the volumetric video scene into a canonical representation. In some embodiments, the at least one memory and the computer program code can be configured to, with the at least one processor, cause the apparatus at least to process separately each frame of a plurality of frames of the canonical representation to yield for each frame a video atlas and corresponding metadata. In some embodiments, the at least one memory and the computer program code can be configured to, with the at least one processor, cause the apparatus at least to analyze a plurality of tiles of each frame of the plurality of frames to identify two or more tiles having a tile characteristic that has a difference value that satisfies, such as by being below, a predetermined threshold. In some embodiments, the at least one memory and the computer program code can be configured to, with the at least one processor, cause the apparatus at least to determine whether at least some of the two or more tiles can be merged to reduce the number of different tiles. In some embodiments, in an instance in which it is determined that at least two of the two or more tiles can be merged, the at least one memory and the computer program code can be configured to, with the at least one processor, cause the apparatus at least to clip at least a first tile from the video atlas and reset the tile offsets for a second tile such that the reset tile offsets for the second tile correspond to a portion of the frame occupied by the first tile and the second tile. In some embodiments, the at least one memory and the computer program code can be configured to, with the at least one processor, cause the apparatus at least to cause storage of the video atlas and the corresponding metadata separately as a video stream and a metadata stream, respectively and convert, at a specified internal processing resolution, each frame of the video stream into a 3D sample of a scene geometry.

In some embodiments, an apparatus for compression of a volumetric video scene can include means for converting the volumetric video scene into a canonical representation. In some embodiments, an apparatus for compression of a volumetric video scene can include means for processing separately each frame of a plurality of frames of the canonical representation to yield for each frame a video atlas and corresponding metadata. In some embodiments, an apparatus for compression of a volumetric video scene can include means for analyzing a plurality of tiles of each frame of the plurality of frames to identify two or more tiles having a tile characteristic that has a difference value that satisfies, such as by being below, a predetermined threshold. In some embodiments, an apparatus for compression of a volumetric video scene can include means for determining whether at least some of the two or more tiles can be merged to reduce the number of different tiles. In some embodiments, in an instance in which it is determined that at least two of the two or more tiles can be merged, the apparatus can include means for clipping at least a first tile from the video atlas and reset the tile offsets for a second tile such that the reset tile offsets for the second tile correspond to a portion of the frame occupied by the first tile and the second tile. In some embodiments, an apparatus for compression of a volumetric video scene can include means for causing storage of the video atlas and the corresponding metadata separately as a video stream and a metadata stream, respectively and converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions comprising program code instructions can be configured, upon execution, to convert the volumetric video scene into a canonical representation. In some embodiments, the computer executable program code instructions comprising program code instructions can be configured, upon execution, to process separately each frame of a plurality of frames of the canonical representation to yield for each frame a video atlas and corresponding metadata. In some embodiments. the computer executable program code instructions comprising program code instructions can be configured, upon execution, to analyze a plurality of tiles of each frame of the plurality of frames to identify two or more tiles having a tile characteristic that has a difference value that satisfies, such as by being below, a predetermined threshold. In some embodiments, the computer executable program code instructions comprising program code instructions can be configured, upon execution, to determine whether at least some of the two or more tiles can be merged to reduce the number of different tiles. In some embodiments, in an instance in which it is determined that at least two of the two or more tiles can be merged, the computer executable program code instructions comprising program code instructions can be configured, upon execution, to clip at least a first tile from the video atlas and reset the tile offsets for a second tile such that the reset tile offsets for the second tile correspond to a portion of the frame occupied by the first tile and the second tile. In some embodiments, the computer executable program code instructions comprising program code instructions can be configured, upon execution, to cause storage of the video atlas and the corresponding metadata separately as a video stream and a metadata stream, respectively. In some embodiments, the computer executable program code instructions comprising program code instructions can be configured, upon execution, to convert, at a specified internal processing resolution, each frame of the video stream into a 3D sample of a scene geometry.

In some embodiments, a method for compression of a volumetric video scene can include converting the volumetric video scene into a canonical representation, processing separately each frame of a plurality of frames of the canonical representation to yield for each frame a video atlas and corresponding metadata, and determining, for a plurality of tiles of each frame of the plurality of frames, whether each tile of the plurality of tiles is a static tile or a dynamic tile. In some embodiments, the method for compression of the volumetric video scene can include flagging the static tiles in the metadata and causing storage of the static tiles from the video atlas, the dynamic tiles from the video atlas, and the corresponding metadata separately as a first video stream, a second video stream, and a metadata stream, respectively. In some embodiments, the method for compression of the volumetric video scene can include converting, at a specified internal processing resolution, each frame of the video stream into a 3D sample of a scene geometry.

In some embodiments, an apparatus for compression of a volumetric video scene can include at least one processor and at least one memory including computer program code for one or more programs. In some embodiments, the at least one memory and the computer program code configured to, with the at least one processor, cause the apparatus at least to convert the volumetric video scene into a canonical representation. In some embodiments, the at least one memory and the computer program code configured to, with the at least one processor, cause the apparatus at least to process separately each frame of a plurality of frames of the canonical representation to yield for each frame a video atlas and corresponding metadata. In some embodiments, the at least one memory and the computer program code configured to, with the at least one processor, cause the apparatus at least to determine, for a plurality of tiles of each frame of the plurality of frames, whether each tile of the plurality of tiles is a static tile or a dynamic tile. In some embodiments, the at least one memory and the computer program code configured to, with the at least one processor, cause the apparatus at least to flag the static tiles in the metadata. In some embodiments, the at least one memory and the computer program code configured to, with the at least one processor, cause the apparatus at least to cause storage of the static tiles from the video atlas, the dynamic tiles from the video atlas, and the corresponding metadata separately as a first video stream, a second video stream, and a metadata stream, respectively. In some embodiments, the at least one memory and the computer program code configured to, with the at least one processor, cause the apparatus at least to convert, at a specified internal processing resolution, each frame of the video stream into a 3D sample of a scene geometry.

In some embodiments, an apparatus for compression of a volumetric video scene can include means for converting the volumetric video scene into a canonical representation. In some embodiments, an apparatus for compression of a volumetric video scene can include means for processing separately each frame of a plurality of frames of the canonical representation to yield for each frame a video atlas and corresponding metadata. In some embodiments, an apparatus for compression of a volumetric video scene can include means for determining, for a plurality of tiles of each frame of the plurality of frames, whether each tile of the plurality of tiles is a static tile or a dynamic tile. In some embodiments, an apparatus for compression of a volumetric video scene can include means for flagging the static tiles in the metadata. In some embodiments, an apparatus for compression of a volumetric video scene can include means for causing storage of the static tiles from the video atlas, the dynamic tiles from the video atlas, and the corresponding metadata separately as a first video stream, a second video stream, and a metadata stream, respectively. In some embodiments, an apparatus for compression of a volumetric video scene can include means for converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions can include program code instructions configured, upon execution, to convert the volumetric video scene into a canonical representation. In some embodiments, the computer executable program code instructions can include program code instructions configured, upon execution, to process separately each frame of a plurality of frames of the canonical representation to yield for each frame a video atlas and corresponding metadata. In some embodiments, the computer executable program code instructions can include program code instructions configured, upon execution, to determine, for a plurality of tiles of each frame of the plurality of frames, whether each tile of the plurality of tiles is a static tile or a dynamic tile. In some embodiments, the computer executable program code instructions can include program code instructions configured, upon execution, to flag the static tiles in the metadata. In some embodiments, the computer executable program code instructions can include program code instructions configured, upon execution, to cause storage of the static tiles from the video atlas, the dynamic tiles from the video atlas, and the corresponding metadata separately as a first video stream, a second video stream, and a metadata stream, respectively. In some embodiments, the computer executable program code instructions can include program code instructions configured, upon execution, to convert, at a specified internal processing resolution, each frame of the video stream into a 3D sample of a scene geometry.

In some embodiments, a method for compression of a volumetric video scene can include converting the volumetric video scene into a canonical representation comprising a plurality of frames, each frame comprising a plurality of tiles, processing separately each of one or more frames of the plurality of frames of the canonical representation to yield for each frame a video atlas and corresponding metadata, and determining whether a tile of the plurality of tiles is a depth tile. In some embodiments, in an instance in which the tile of the plurality of tiles is determined to be a depth tile, the method for compression of the volumetric video scene can include determining whether the tile is a static tile or a dynamic tile. In some embodiments, in an instance in which the tile is a static tile, the method for compression of the volumetric video scene can include causing storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, the method for compression of the volumetric video scene can include causing storage of the video atlas and the corresponding metadata separately as a video stream and a metadata stream, respectively. In some embodiments, the method for compression of the volumetric video scene can include converting, at a specified internal processing resolution, each frame of the video stream into a 3D sample of a scene geometry.

In some embodiments, an apparatus for compression of a volumetric video scene can include at least one processor and at least one memory including computer program code for one or more programs. In some embodiments, the at least one memory and the computer program code can be configured to, with the at least one processor, cause the apparatus at least to convert the volumetric video scene into a canonical representation comprising a plurality of frames, each frame comprising a plurality of tiles. In some embodiments, the at least one memory and the computer program code can be configured to, with the at least one processor, cause the apparatus at least to process separately each of one or more frames of the plurality of frames of the canonical representation to yield for each frame a video atlas and corresponding metadata. In some embodiments, the at least one memory and the computer program code can be configured to, with the at least one processor, cause the apparatus at least to determine whether a tile of the plurality of tiles is a depth tile. In some embodiments, in an instance in which the tile of the plurality of tiles is determined to be a depth tile, the at least one memory and the computer program code can be configured to, with the at least one processor, cause the apparatus at least to determine whether the tile is a static tile or a dynamic tile. In some embodiments, in an instance in which the tile is a static tile, the at least one memory and the computer program code can be configured to, with the at least one processor, cause the apparatus at least to cause storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, the at least one memory and the computer program code can be configured to, with the at least one processor, cause the apparatus at least to cause storage of the video atlas and the corresponding metadata separately as a video stream and a metadata stream, respectively. In some embodiments, the at least one memory and the computer program code can be configured to, with the at least one processor, cause the apparatus at least to convert, at a specified internal processing resolution, each frame of the video stream into a 3D sample of a scene geometry.

In some embodiments, an apparatus for compression of a volumetric video scene can include means for converting the volumetric video scene into a canonical representation comprising a plurality of frames, each frame comprising a plurality of tiles. In some embodiments, an apparatus for compression of a volumetric video scene can include means for processing separately each of one or more frames of the plurality of frames of the canonical representation to yield for each frame a video atlas and corresponding metadata. In some embodiments, an apparatus for compression of a volumetric video scene can include means for determining whether a tile of the plurality of tiles is a depth tile. In some embodiments, in an instance in which the tile of the plurality of tiles is determined to be a depth tile, the apparatus can include means for determining whether the tile is a static tile or a dynamic tile. In some embodiments, in an instance in which the tile is a static tile, the apparatus can include means for causing storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, an apparatus for compression of a volumetric video scene can include means for causing storage of the video atlas and the corresponding metadata separately as a video stream and a metadata stream, respectively. In some embodiments, an apparatus for compression of a volumetric video scene can include means for converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions comprising program code instructions can be configured, upon execution, to convert the volumetric video scene into a canonical representation comprising a plurality of frames, each frame comprising a plurality of tiles. In some embodiments, the computer executable program code instructions comprising program code instructions can be configured, upon execution, to process separately each of one or more frames of the plurality of frames of the canonical representation to yield for each frame a video atlas and corresponding metadata. In some embodiments, the computer executable program code instructions comprising program code instructions can be configured, upon execution, to determine whether a tile of the plurality of tiles is a depth tile. In some embodiments, in an instance in which the tile of the plurality of tiles is determined to be a depth tile, the computer executable program code instructions comprising program code instructions can be configured, upon execution, to determine whether the tile is a static tile or a dynamic tile. In some embodiments, in an instance in which the tile is a static tile, the computer executable program code instructions comprising program code instructions can be configured, upon execution, to cause storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, the computer executable program code instructions comprising program code instructions can be configured, upon execution, to cause storage of the video atlas and the corresponding metadata separately as a video stream and a metadata stream, respectively. In some embodiments, the computer executable program code instructions comprising program code instructions can be configured, upon execution, to convert, at a specified internal processing resolution, each frame of the video stream into a 3D sample of a scene geometry.

In some embodiments, a method can be provided that comprises: separating one or more layouts based on a type for a plurality of volumetric video component atlases; determining one or more atlas characteristics of each of one or more volumetric video component atlases of the plurality of volumetric video component atlases; causing storage of information indicative of the one or more atlas characteristics of the one or more volumetric video component atlases as corresponding metadata; and determining one or more suitable packing strategies from among a plurality of packing strategies based on the one or more atlas characteristics, thereby indicating different volumetric video component types based on different layout types for the plurality of volumetric video component atlases.

In some embodiments, the method can further comprise determining the one or more suitable packing strategies based on the type of volumetric video component, wherein different packing strategies are used for different volumetric video components, which results in video components having different patch layouts or different sizes. In some embodiments, the method can further comprise applying one of the one or more suitable packing strategies to a volumetric video component that represents depth or distance from camera of a patch of volumetric video, wherein the patch comprises a flat geometry surface without edges, where the patch is down-scaled or signaled otherwise, resulting in a reduction in a number of pixels used to represent the patch. In some embodiments, the method can further comprise applying one of the one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component. In some embodiments, the method can further comprise applying one of said one or more suitable packing strategies to a volumetric video component that utilizes intra or inter patch redundancy, interpolation or other non-visual compression method to reduce resolution or frequency of signaling, thereby using different ones of the one or more layouts between different compressed volumetric video components. In some embodiments, the method can further comprise converting, at a specified internal processing resolution, a volumetric video scene into a three dimensional (3D) sample of a scene geometry. In some embodiments, the method can further comprise voxelizing a mesh model of a volumetric video and down-sampling a high resolution canonical representation. In some embodiments, the method can further comprise providing a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, a material attribute or any visually compressed component of the volumetric video scene.

In some embodiments, an apparatus can be provided that comprises at least one processor and at least one memory including computer program code for one or more programs with the at least one memory and the computer program code being configured to, with the at least one processor, cause the apparatus at least to: separate one or more layouts based on a type for a plurality of volumetric video component atlases; determine one or more atlas characteristics of each of one or more volumetric video component atlases of the plurality of volumetric video component atlases; cause storage of information indicative of the one or more atlas characteristics of the one or more volumetric video component atlases as corresponding metadata; and determine one or more suitable packing strategies from among a plurality of packing strategies based on the one or more atlas characteristics, thereby indicating different volumetric video component types based on different layout types for the plurality of volumetric video component atlases.

In some embodiments, the at least one memory and the computer program code are further configured to, with the at least one processor, cause the apparatus at least to: determine the one or more suitable packing strategies based on the type of volumetric video component, wherein different packing strategies are used for different volumetric video components, which results in video components having different patch layouts or different sizes. In some embodiments, the at least one memory and the computer program code are further configured to, with the at least one processor, cause the apparatus at least to: apply one of the one or more suitable packing strategies to a volumetric video component that represents depth or distance from a camera of a patch of volumetric video, wherein the patch comprises a flat geometry surface without edges, where the patch is down-scaled or signaled otherwise, resulting in a reduction in a number of pixels used to represent the patch. In some embodiments, the at least one memory and the computer program code are further configured to, with the at least one processor, cause the apparatus at least to: apply one of the one or more suitable packing strategies to a volumetric video component that represents texture or color information of a surface within a patch of volumetric video, where similarities between patches are exploited to signal smaller patches inside larger patches, resulting in a reduction in a number of pixels used to represent the volumetric video component. In some embodiments, the at least one memory and the computer program code are further configured to, with the at least one processor, cause the apparatus at least to: apply one of the one or more suitable packing strategies to a volumetric video component that utilizes intra or inter patch redundancy, interpolation or other non-visual compression method to reduce resolution or frequency of signaling, thereby using different of the one or more layouts between different compressed volumetric video components. In some embodiments, the at least one memory and the computer program code are further configured to, with the at least one processor, cause the apparatus at least to: convert, at a specified internal processing resolution, a volumetric video scene into a three-dimensional (3D) sample of a scene geometry. In some embodiments, the at least one memory and the computer program code are further configured to, with the at least one processor, cause the apparatus at least to: voxelize a mesh model of a volumetric video and down-sampling a high-resolution canonical representation. In some embodiments, the at least one memory and the computer program code are further configured to, with the at least one processor, cause the apparatus at least to: provide a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, a material attribute or any visually compressed component of the volumetric video scene.

In some embodiments, an apparatus can be provided that comprises means for: separating one or more layouts based on a type for a plurality of volumetric video component atlases; means for determining one or more atlas characteristics of each of one or more volumetric video component atlases of the plurality of volumetric video component atlases; means for causing storage of information indicative of the one or more atlas characteristics of the one or more volumetric video component atlases as corresponding metadata; and means for determining one or more suitable packing strategies from among a plurality of packing strategies based on the one or more atlas characteristics, thereby indicating different volumetric video component types based on different layout types for the plurality of volumetric video component atlases.

In some embodiments, the apparatus can further comprise means for determining the one or more suitable packing strategies based on the type of volumetric video component, wherein different packing strategies are used for different volumetric video components, which results in video components having different patch layouts or different sizes. In some embodiments, the apparatus can further comprise means for applying one of the one or more suitable packing strategies to a volumetric video component that represents depth or distance from a camera of a patch of volumetric video, wherein the patch comprises a flat geometry surface without edges, where the patch is down-scaled or signaled otherwise, resulting in a reduction in a number of pixels used to represent the patch. In some embodiments, the apparatus can further comprise means for applying one of the one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component. In some embodiments, the apparatus can further comprise means for applying one of the one or more suitable packing strategies to a volumetric video component that utilizes intra or inter patch redundancy, interpolation or other non-visual compression method to reduce resolution or frequency of signaling, thereby using different ones of the one or more layouts between different compressed volumetric video components. In some embodiments, the apparatus can further comprise means for converting, at a specified internal processing resolution, a volumetric video scene into a three dimensional (3D) sample of a scene geometry. In some embodiments, the apparatus can further comprise means for voxelizing a mesh model of a volumetric video and down-sampling a high resolution canonical representation. In some embodiments, the apparatus can further comprise means for providing a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, a material attribute or any visually compressed component of the volumetric video scene.

In some embodiments, a computer program product can be provided that comprises at least one non-transitory computer-readable storage medium having computer executable program code instructions stored therein with the computer executable program code instructions comprising program code instructions configured, upon execution, to: separate one or more layouts based on a type for a plurality of volumetric video component atlases; determine one or more atlas characteristics of each of one or more volumetric video component atlases of the plurality of volumetric video component atlases; cause storage of information indicative of the one or more atlas characteristics of the one or more volumetric video component atlases as corresponding metadata; and determine one or more suitable packing strategies from among a plurality of packing strategies based on the one or more atlas characteristics, thereby indicating different volumetric video component types based on different layout types for the plurality of volumetric video component atlases.

In some embodiments, the computer executable program code instructions can further comprise program code instructions configured, upon execution, to: determine the one or more suitable packing strategies based on the type of volumetric video component, wherein different packing strategies are used for different volumetric video components, which results in video components having different patch layouts or different sizes; apply one of the one or more suitable packing strategies to a volumetric video component that represents depth or distance from a camera of a patch of volumetric video, wherein the patch comprises a flat geometry surface without edges, where the patch is down-scaled or signaled otherwise, resulting in a reduction in a number of pixels used to represent the patch; apply one of the one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component; apply one of the one or more suitable packing strategies to a volumetric video component that utilizes intra or inter patch redundancy, interpolation or other non-visual compression method to reduce resolution or frequency of signaling, thereby using different ones of the one or more layouts between different compressed volumetric video components; convert, at a specified internal processing resolution, a volumetric video scene into a three dimensional (3D) sample of a scene geometry; voxelize a mesh model of a volumetric video and down-sample a high resolution canonical representation; or provide a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
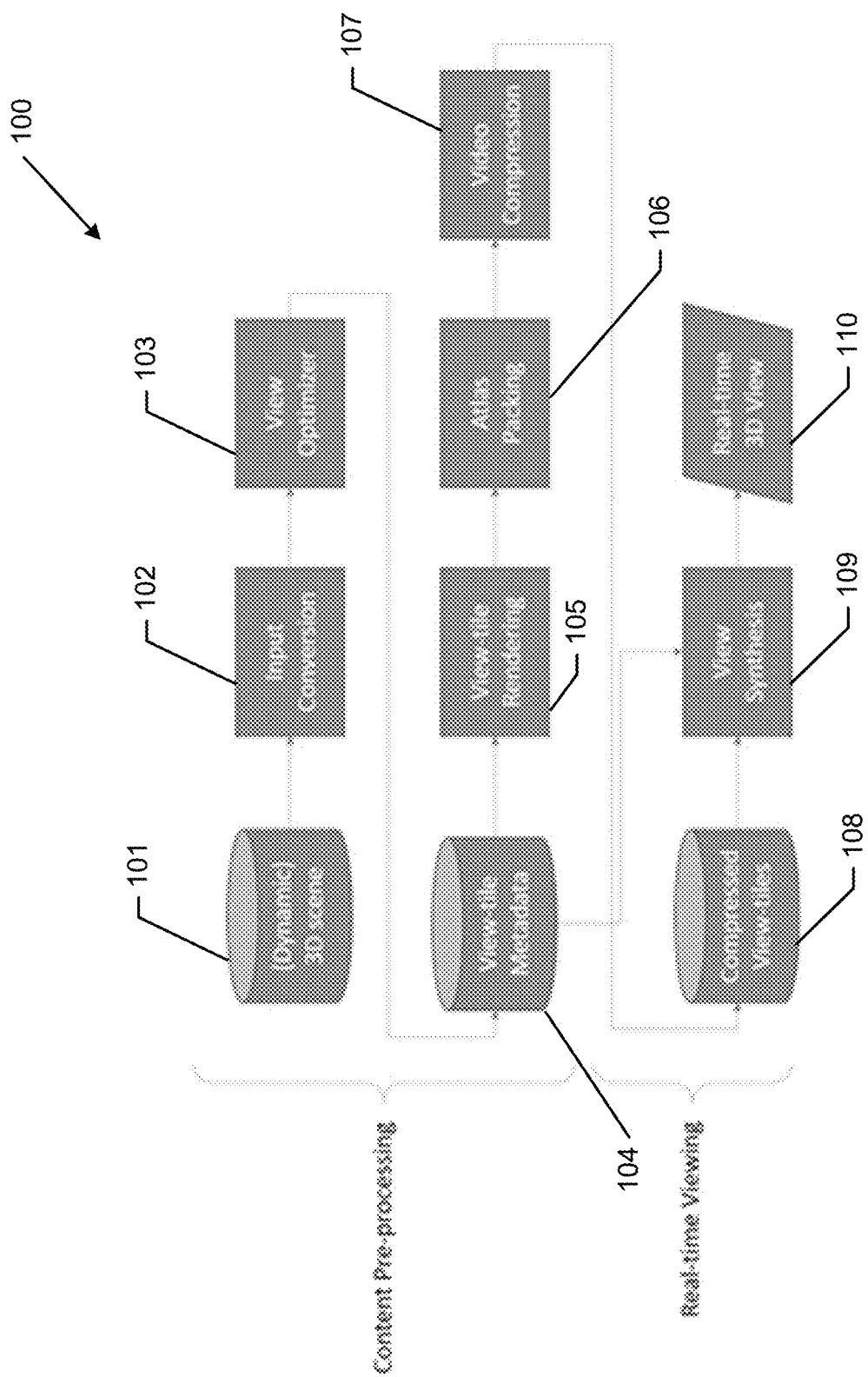
Figure 2:
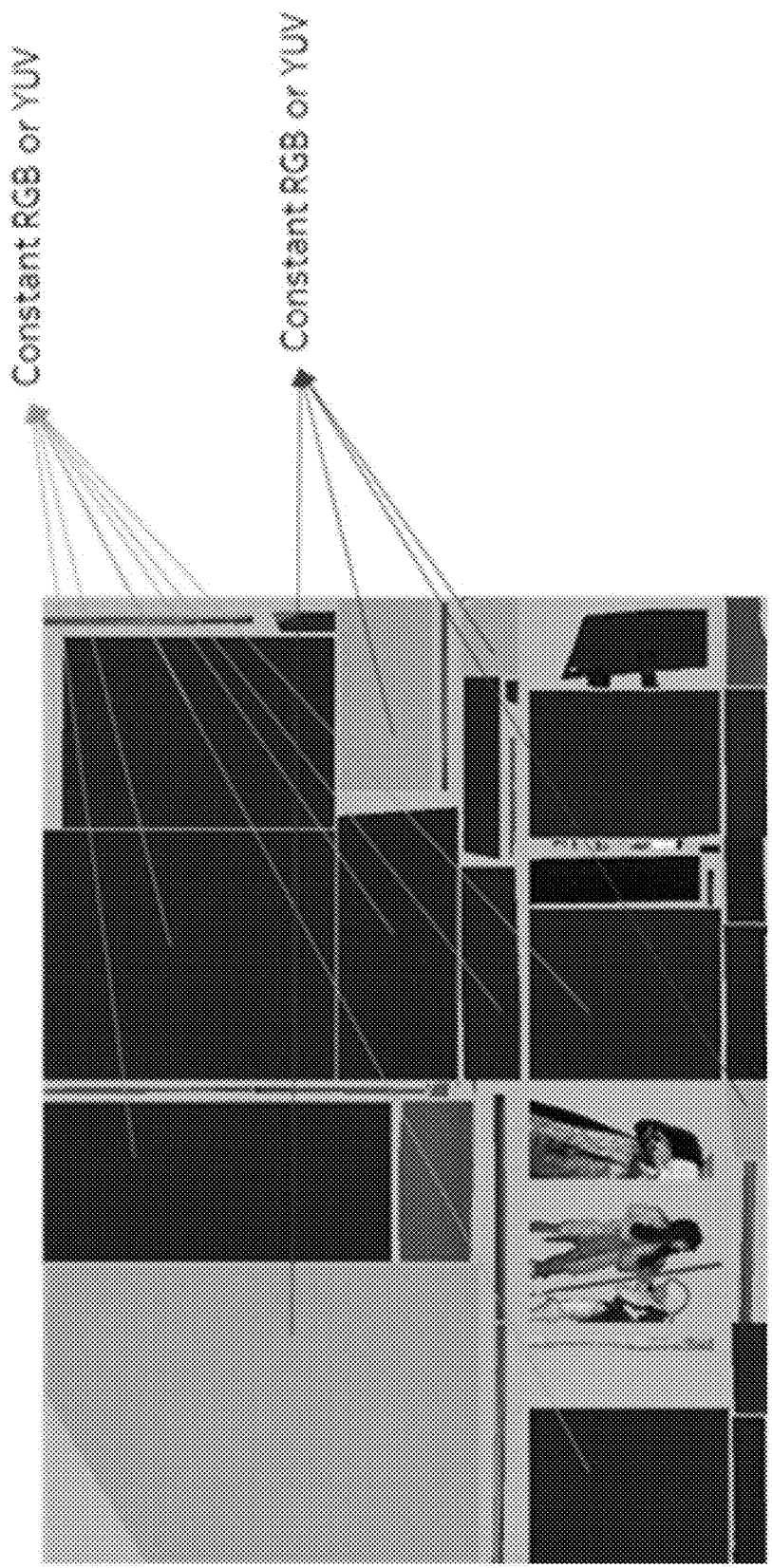
Figure 3:
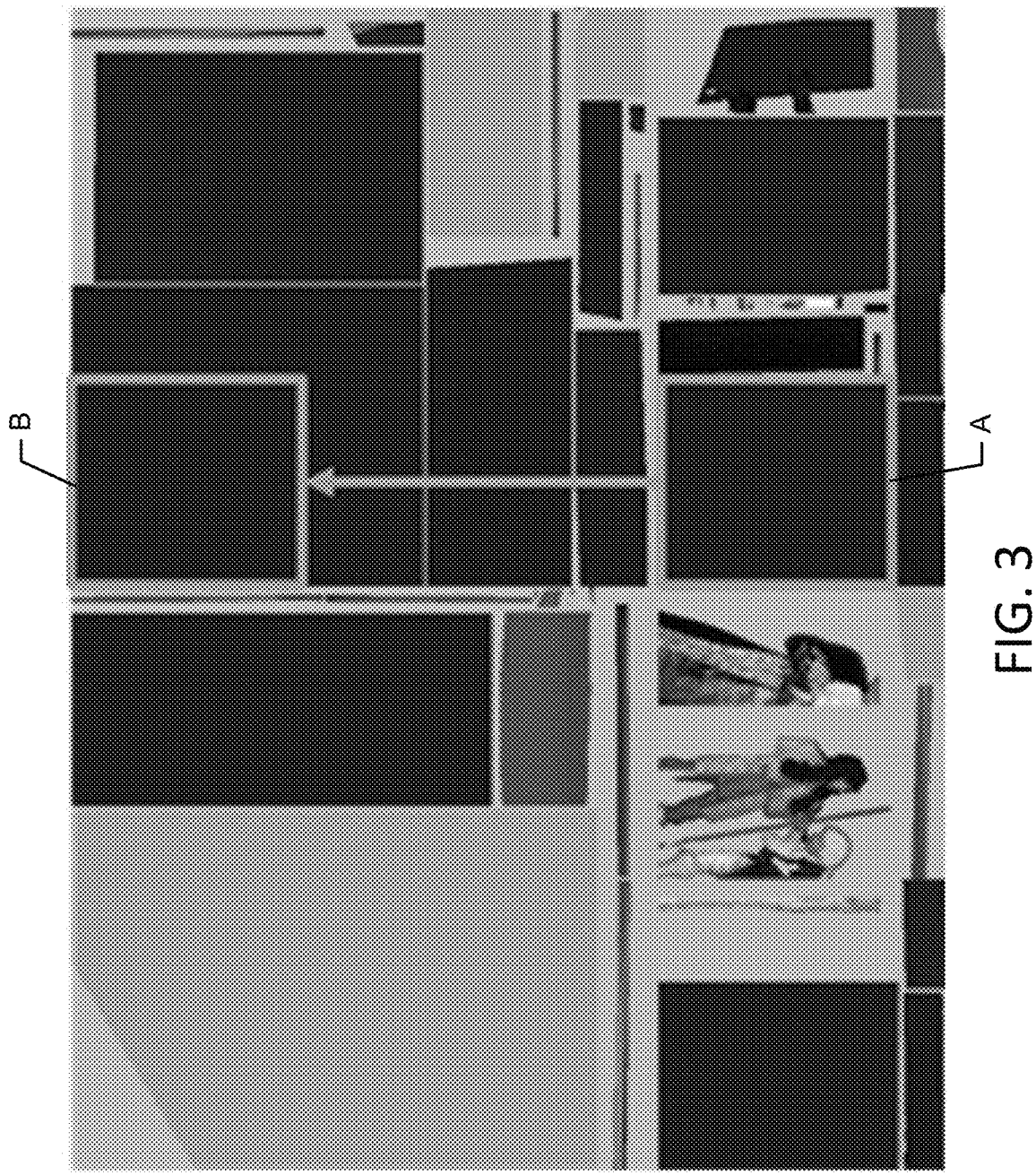
Figure 5:
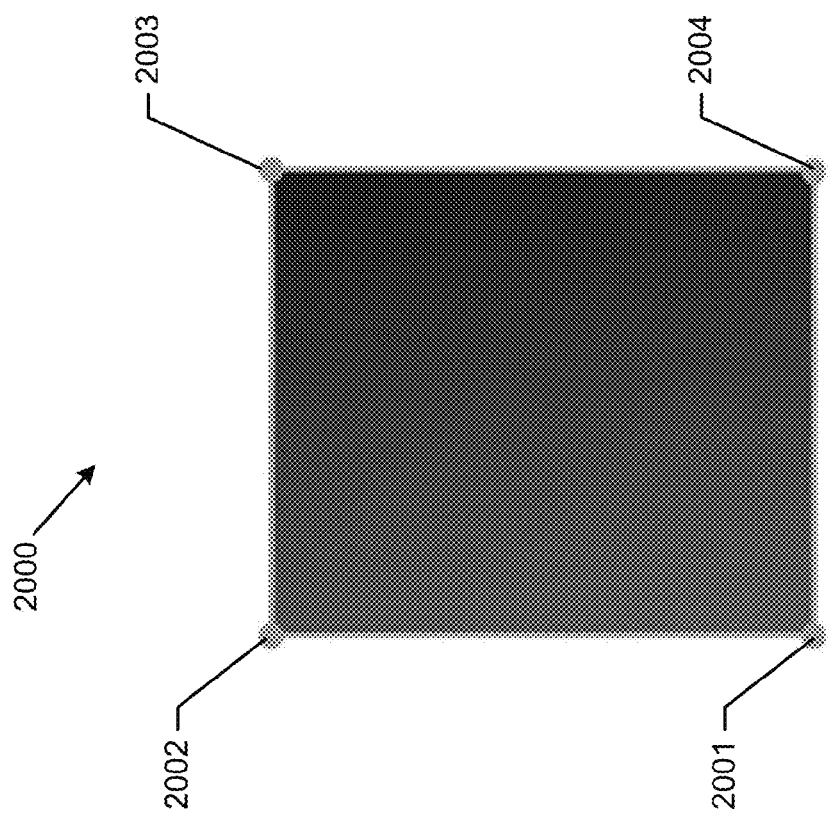
Figure 4:
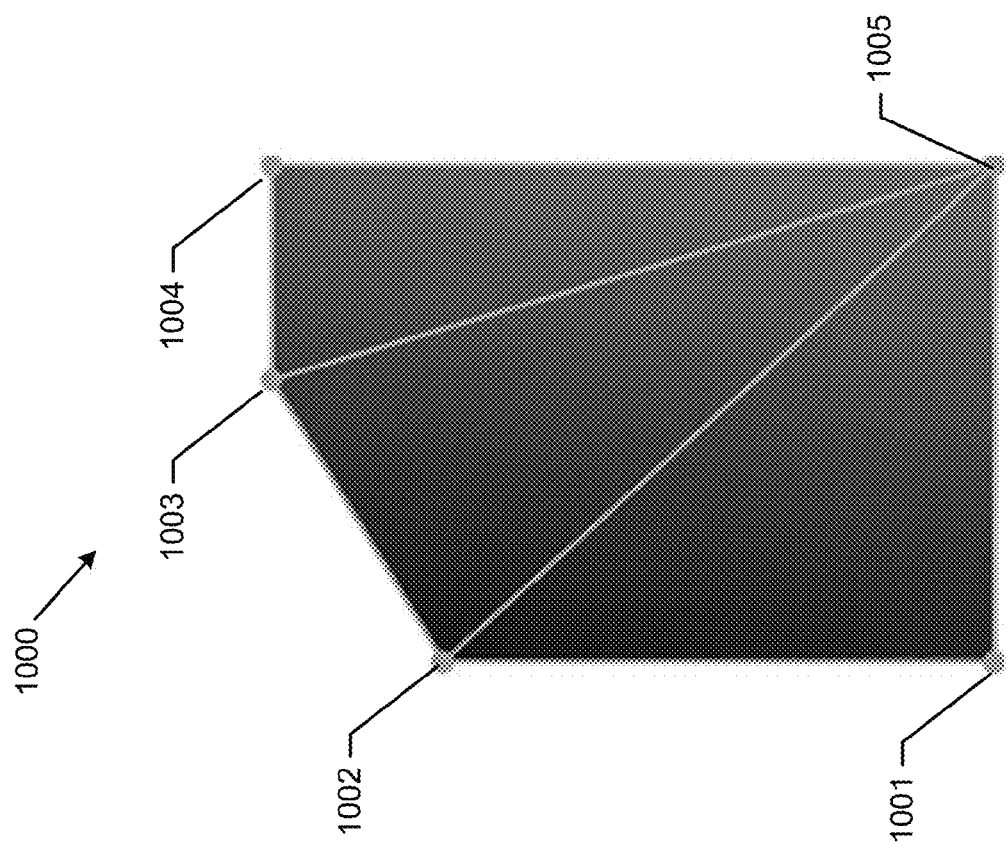
Figure 7:
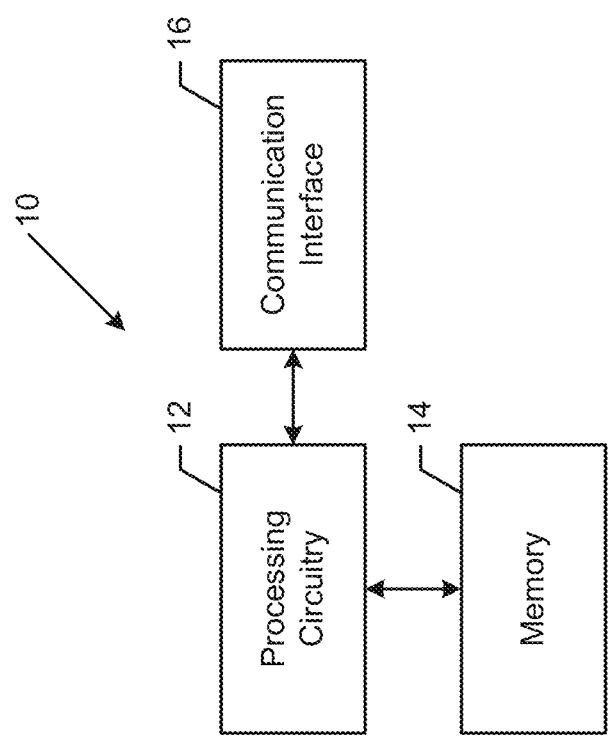
Figure 8:
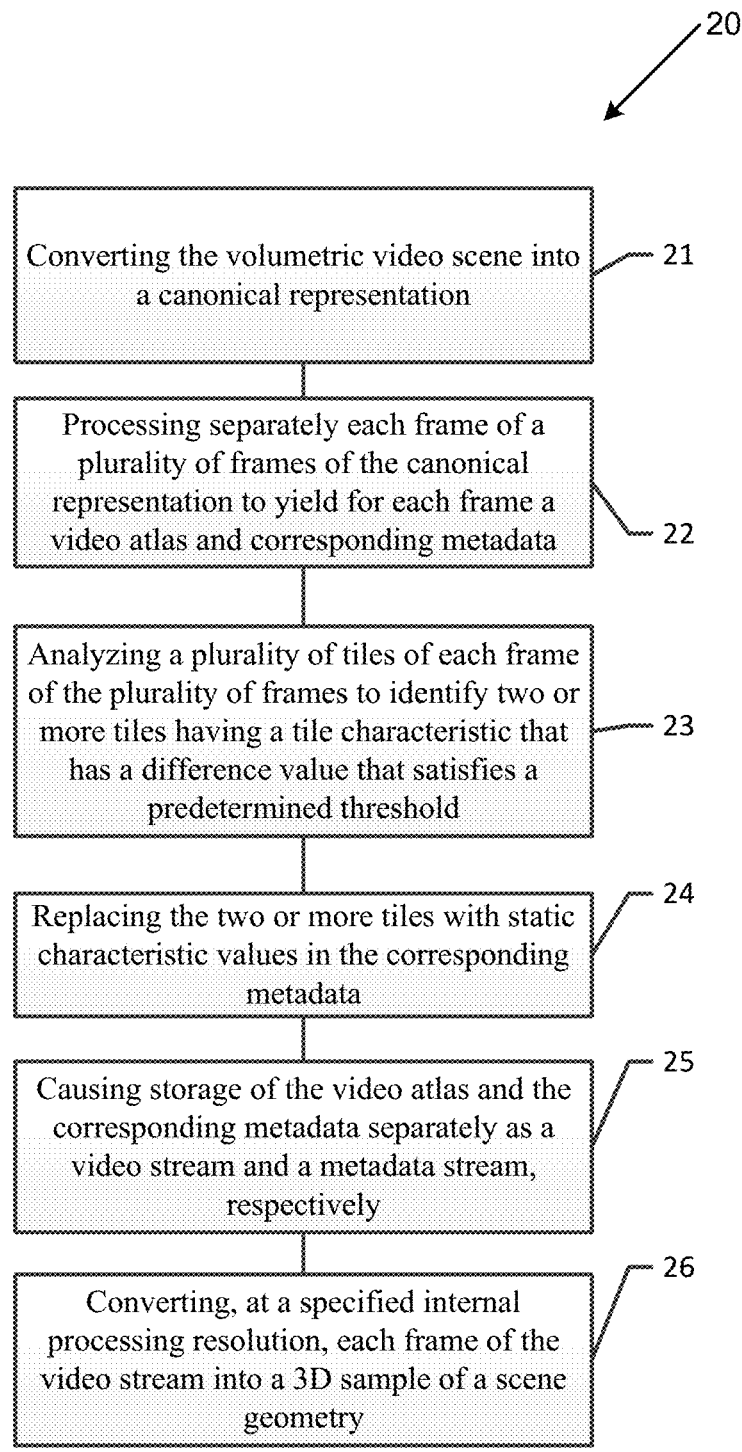
Figure 9:
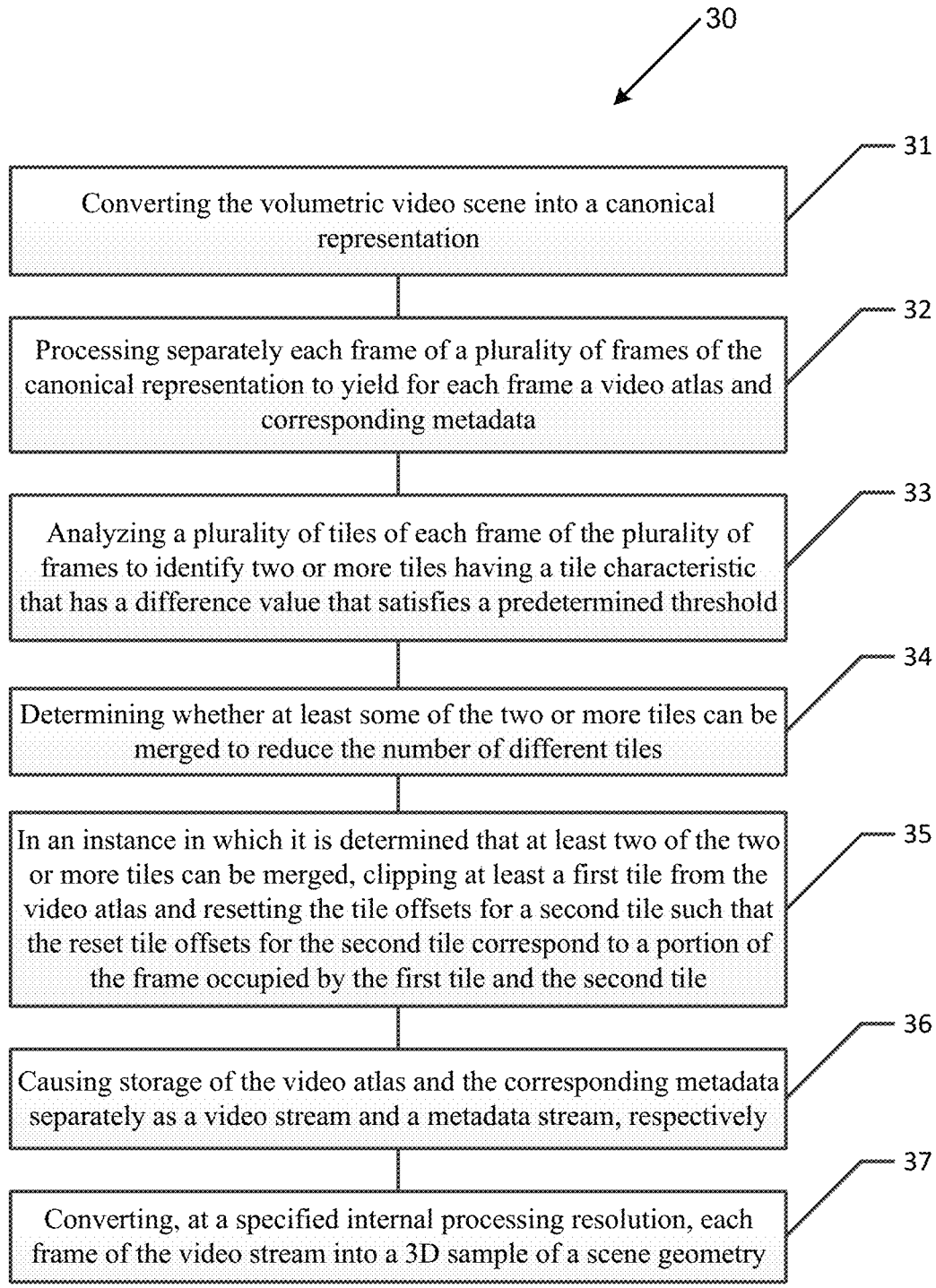
Figure 10:
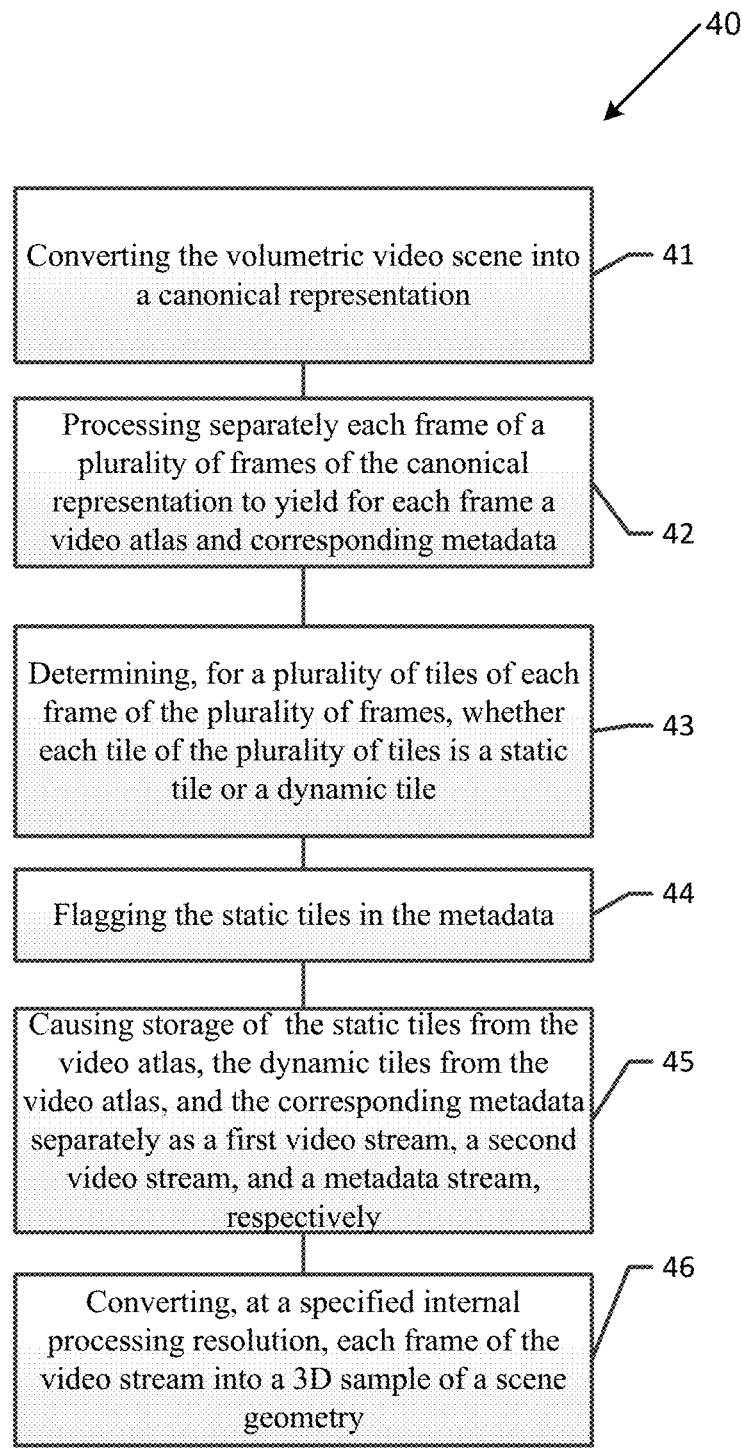
Figure 11:
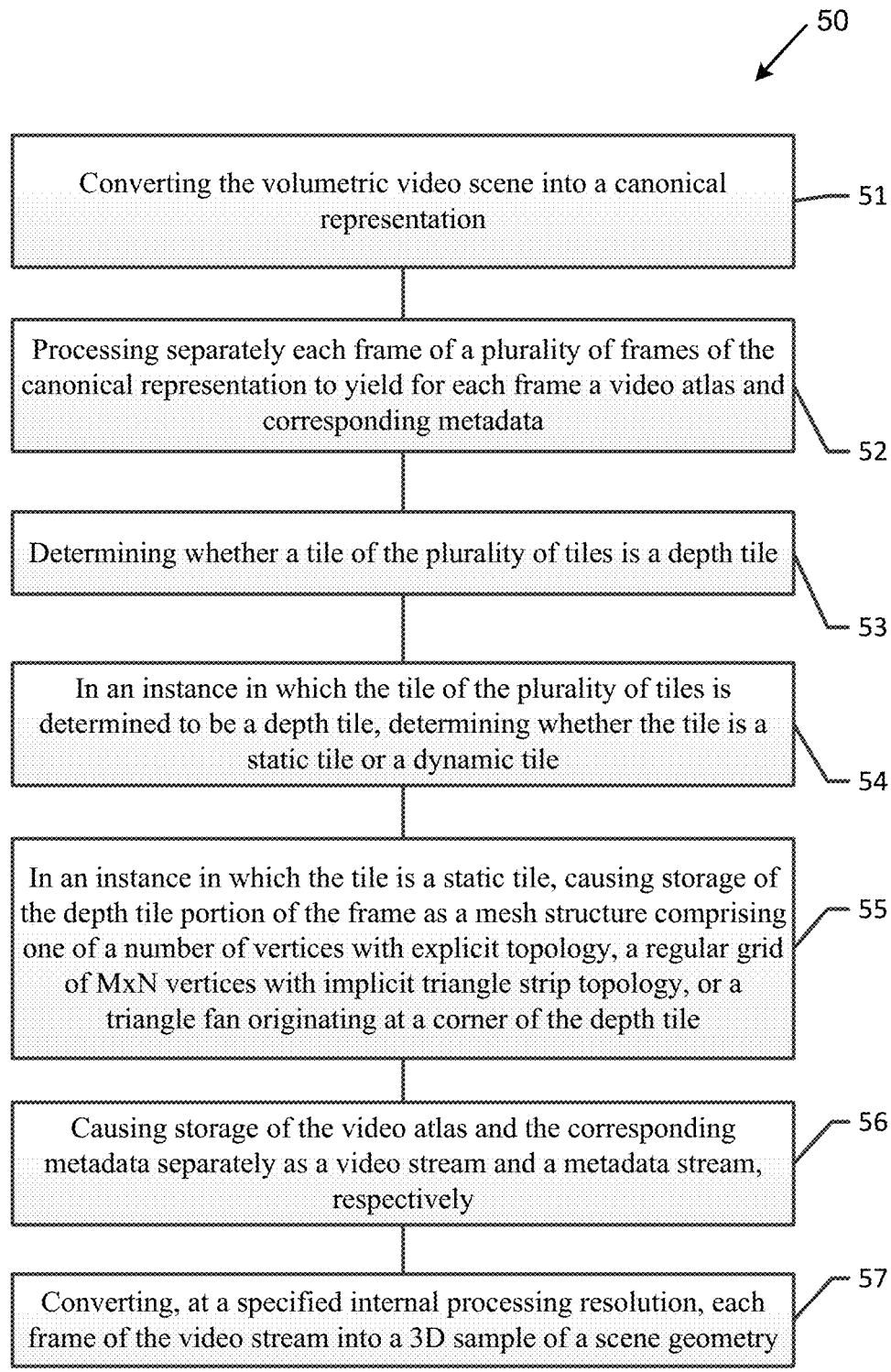

Having thus described embodiments of the disclosure in general terms, reference will now be made to the accompanying drawings, which are not necessarily drawn to scale, and wherein:

FIG. 1 is a block diagram of a volumetric video compression process, according to an embodiment;

FIG. 2 illustrates an array of tiles that consist substantially of a single color value usable for uniform tile detection prior to video compression, according to an embodiment;

FIG. 3 illustrates an array of tiles having at least one tile that can be merged with another tile, according to an embodiment;

FIG. 4 illustrates a depth tile characterized as five vertices, according to an embodiment;

FIG. 5 illustrates a depth tile that can be compressed to represent planes as $ax+by+cz+d=0$, thus only requiring four values to encode a single plane, according to an embodiment;

FIGS. 6A and 6B illustrate a process for depth tile down sampling, e.g., using an edge detection algorithm, according to an embodiment;

FIG. 7 is a block diagram illustrating an apparatus configured to carry out a method for volumetric video compression, according to an embodiment;

FIG. 8 is a flow chart illustrating operations performed for volumetric video compression, such as by the apparatus of FIG. 7, according to an embodiment;

FIG. 9 is a flow chart illustrating operations performed for volumetric video compression, such as by the apparatus of FIG. 7, according to another embodiment;

FIG. 10 is a flow chart illustrating operations performed for volumetric video compression, such as by the apparatus of FIG. 7, according to a further embodiment; and FIG. 11 is a flow chart illustrating operations performed for volumetric video compression, such as by the apparatus of FIG. 7, according to yet another embodiment.

DETAILED DESCRIPTION

In the field of volumetric video compression and 3 degrees-of-freedom and greater (3DoF+) video, a character or a scene captured with a set of depth cameras or synthetically modelled and animated as a three dimensional (3D) scene, can be encoded as a volumetric video. Volumetric video compression typically segments the 3D content into a set of two dimensional (2D) tiles or tiles containing color and geometry data, which can then be compressed using a standard 2D video compression format. Thus, color and geometry data can be considered as components of volumetric video. Volumetric video compression is currently typically being explored and standardized in the MPEG-I Point Cloud Compression (PCC) and 3DoF+ efforts, for example.

A proposed approach for 3DoF+ volumetric video compression can use 3D scene segmentation to generate views that can be packed into atlases and efficiently encoded using existing 2D compression technologies such as H.265 or H.264. For the end-user to consume such content, a standard metadata format may need to be defined that efficiently describes information required for view synthesis. The current video-based point cloud compression (V-PCC) specification defines similar metadata structures while setting limits for atlas packing strategies by defining shared tile layouts for all components (color, depth, etc.) of volumetric video.

Thus, there is an ongoing need for metadata formats and structures that enable application of different atlas packing methods for different components of 3D video that result in significantly smaller atlas sizes and overall bitrates. V-PCC standardization in MPEG defines many structures that such an approach can leverage. However, as the separation of tile layouts for color and depth components is not supported, the application of packing strategies for individual components is limited under currently available approaches. Atlas packing is a bin packing problem, and many optimizations exist for coming up with an optimal atlas layout (e.g., sprite texture packing). Therefore, there is also an ongoing need for approaches for applying different packing methods for each component of volumetric video that defines accompanying metadata format that supports view reconstruction by client devices.

Volumetric video data represents a three-dimensional (3D) scene or object and may be utilized in conjunction with a variety of applications including, for example, augmented reality (AR), virtual reality (VR) and mixed reality (MR) applications. Volumetric video data describes geometry, that is, shape, size and position in a 3D space, and respective attributes of the geometrical features or tile attributes. In some embodiments, the tile attributes can be one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like. Volumetric video data may also represent temporal changes to the geometry and/or attributes at one or more given time instances. Volumetric video may be generated from 3D models, such as computer generated images (CGI), or may be captured from real-world scenes using a variety of capture techniques, such as, a multi-camera system, a laser scan, a combination of video and dedicated depth sensors, etc. Volumetric video may also be generated by a combination of CGI and real-world scenes that are captured. Representation formats for volumetric video data include triangle meshes, point clouds, or voxels. Temporal information regarding a scene may be included in the form of individual capture instances, similar to frames in a two-dimensional (2D) video, or by other techniques, such as the position of an object as a function of time. Because volumetric video describes a 3D scene or object, volumetric video data can be viewed from any viewpoint. Thus, volumetric video may be useful in order to provide multiple degree of freedom (DOF) viewing capabilities, such as 3DOF+ (e.g., 6DoF).

Increasing computational resources and advances in three dimensional (3D) data acquisition devices has enabled reconstruction of detailed volumetric video representations, e.g., of natural or synthesized scenes. Infrared devices, lasers, time-of-flight devices and structured light devices are all examples of data acquisition devices that can be used to capture 3D video data. Representation of the 3D data depends on the manner in which the 3D data is to be used. Dense voxel arrays have been used to represent volumetric medical data. In applications utilizing 3D graphics, polygonal meshes are used. For applications in which real world 3D scenes have been captured but the topology is not necessarily a two dimensional (2D) manifold, point clouds may be utilized to represent the 3D data. Another way to represent 3D data is coding this 3D data as a set of texture and depth maps as is the case in the multi-view plus depth. Related to the techniques used in multi-view plus depth is the use of elevation maps, and multi-level surface maps.

In dense point clouds or voxel arrays, the reconstructed 3D scene may contain tens or even hundreds of millions of points. If such representations are to be stored or interchanged between entities, then the data points must be compressed. Standard volumetric video representation formats, such as point clouds, meshes and voxels, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxels. Therefore, compression of dynamic 3D scenes is inefficient. 2D-video based approaches for compressing volumetric data, e.g., multiview and depth, have much better compression efficiency, but rarely cover the full scene. Therefore, they provide only limited three degrees of freedom and greater (3DoF+) capabilities.

Alternatively, a 3D scene, represented as meshes, points, and/or voxels, can be projected onto one, or more, geometries. These geometries are "unfolded" onto 2D planes with two planes per geometry, one plane for texture and one plane for depth. The 2D planes are then encoded using standard 2D video compression technologies. Relevant projection geometry information is transmitted along with the encoded video files to the decoder. The decoder decodes the video and performs the inverse projection to regenerate the 3D scene in any desired representation format (not necessarily the starting format). Projecting volumetric models onto 2D planes allows for using standard 2D video coding tools with efficient temporal compression. Thus, coding efficiency is increased. Using geometry-projections instead of prior 2D-video based approaches, e.g. multiview and depth, provide a better coverage of the scene or object. Thus, 3DOF+ (e.g., 6DoF) capabilities are improved. Using several geometries for individual objects further improves the coverage of the scene. Furthermore, standard video encoding hardware can be utilized for real-time compression/decompression of the projected planes.

According to some embodiments, volumetric video compression can often generate an array of tiles by decomposing the point cloud data into a plurality of tiles. The tiles are mapped to a 2D grid and, in some instances, an occupancy map is generated from any of a variety of tile attributes (such as one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like), where occupied pixels are pixels which have valid tile attribute values, e.g., depth values and/or color values. Geometry images, texture images and/or the like may then be generated for subsequent storage and/or transmission. In some embodiments, the compressed images may thereafter be decompressed and the geometry and texture may be reconstructed, such that the image may then be viewed.

In projection-based volumetric video compression, a 3D surface is projected onto a 2D grid. The 2D grid has a finite resolution. Thus, in some embodiments, two or more points of the 3D surface may be projected on the same 2D pixel location. The image generation process exploits the 3D to 2D mapping to store the geometry and texture of the point cloud as images. In order to address multiple points being projected to the same pixel, each tile is projected onto two images, referred to as layers. In some instances, the first geometry layer is encoded as it is and the second geometry layer is encoded as a delta to the first layer. Texture frames may be generated similarly, but both texture layer 1 and layer 2 may be encoded as separated texture frames.

In an effort to retain the high frequency features, one approach involves absolute coding with reconstruction correction. Another approach to retain the high frequency features involves geometry-based point interpolation. In some embodiments, the compression efficiency of geometry images is improved by replacing some of the geometry information explicitly encoded using geometry images by a point interpolation algorithm.

Some approaches require modifications to the encoder such that less information is compressed. In addition, geometry reconstruction, that is, point interpolation, is added to assist with texture compression. During texture compression, geometry interpolation is used to generate missing points and improve the point cloud geometry reconstruction.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

As described herein, certain example embodiments generally relate to encoding of volumetric video for compression and a definition of metadata structures and compression methods for individual volumetric video components. For example, a character or scene captured with a set of depth cameras, or a synthetically modelled and animated 3D scene are examples of 3D content that can be encoded as volumetric video. Approaches for volumetric video compression often include segmenting the 3D content into a set of 2D tiles or tiles containing tile attributes such as one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like, which can then be compressed using a standard 2D video compression format. Thus, tile attributes, e.g., color and geometry data, can be considered as components of volumetric video. Volumetric video compression is currently being explored and standardized as part of the MPEG-I Point Cloud Compression (PCC) and 3DoF+ efforts, for example.

Some approaches described herein for solving 3DoF+ volumetric video compression rely on 3D scene segmentation to generate views that can be packed into atlases and efficiently encoded using existing 2D compression technologies, such as H.265 or H.264. For the end-user to consume such content, a standard metadata format needs to be defined that efficiently describes information required for view synthesis. Some current V-PCC specifications define similar metadata structures while setting limits to atlas packing strategies by defining shared tile layouts for all components (tile attributes such as one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like) of volumetric video. In some embodiments of the current disclosure, some structures for a metadata format can enable application of different atlas packing methods for different components of 3D video, thus resulting in significantly smaller atlas sizes and overall bitrates. In some embodiments, associated methods can be applied for individual volumetric video components.

V-PCC standardization in MPEG defines many structures that an example embodiment of the disclosed approaches can leverage. However, the separation of tile layouts for tile attributes such as one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like is not supported, thus the application of novel packing strategies for individual components is not possible. As described herein, atlas packing is a bin packing problem, and many optimizations exist for coming up with an optimal atlas layout (e.g., sprite texture packing). According to some embodiments of the current disclosure, different packing methods for each component of volumetric video can be defined that accompany metadata formats that support view reconstruction by client devices.

In some embodiments, a pipeline for 3DoF+ delivery can leverage a level of temporal coherency, which allows for maintaining constant tile-layouts for atlases over an entire group of pictures (GoP), typically an intra period. This approach may enable more efficient compression for individual volumetric video components while requiring less frequent metadata updates, among other benefits. In other words, according to some embodiments of the present disclosure, a method can include separating layouts of different types of volumetric video component atlases (depth, texture, roughness, normals, etc.). In some embodiments, using the structures in the corresponding metadata as means for storing atlas, frame, or tile characteristic information allows for the selection of one or more packing strategies based on the characteristics of those components. Since any particular packing strategy may not always work for all components, for example when the packing strategy is only applicable for a single component, such an approach can pick a suitable, preferable, best, optimal or other such packing strategy for a particular volumetric video section, frame, atlas, and/or tile individually. In some embodiments, such an approach can yield a single set of metadata for a plurality of frames while the video atlas contains per-frame data. As such, in some embodiments, a volumetric video preparation and packing approach can take advantage of different metadata for different tile characteristics (e.g., color tiles, geometry tiles, etc.), and can employ different packing strategies for different characteristics depending on the content.

Without wishing to be bound by any particular theory, by defining individual packing strategies for each component of volumetric video, the size of component video streams can be further reduced, thus reducing the overall bandwidth requirements for delivering volumetric video content. In some embodiments, compression methods can be applied that only work for a first tile attribute, such as a depth component, without adversely effecting a second tile attribute, such as a color quality. In some embodiments, compression methods can be applied that only work for the color quality without adversely affecting the depth component, and/or for other tile attributes. An example of such method would be to down-scale "flat" depth maps while maintaining full resolution color detail. Other methods and approaches are described herein, however any suitable compression method or combination of compression methods can be applied and is contemplated within the scope of this disclosure.

In some embodiments, volumetric video compression can be carried out, generally, in a compression pipeline. In some embodiments, individual packing strategies can be applied for different components of the volumetric video in the context of that pipeline. By way of example only, at least some of the tiles comprising an image or the image itself can be packed by way of a first approach into a video stream while the metadata corresponding to the tiles or the image is packed via a second approach into a metadata stream. In some embodiments, a group of pictures (GoP) can be split into frames and each frame can be subdivided into tiles based on an tile attributes such as one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like. In some embodiments, a portion of the tiles of a frame can be considered static tiles in that the tile characteristic remains unchanged or changes only within a predetermined range or variance between frames within the GoP. In some embodiments, tiles that are static between a plurality of the frames within the GoP can be stored as a single instance of the tile and the associated frames to which the single instance corresponds can be stored in the metadata stream. Such approaches may lead to a reduction in computational complexity of encoding/decoding, decreased transmission bandwidth, and decreased storage requirements when deploying the decoded volumetric video for viewing. In some embodiments, particular metadata format structures can be used to support the particular packing methods described herein.

Referring now to FIG. 1, the basic compression of a volumetric video scene is illustrated as a video compression pipeline 100. Generally, each frame of an input 3D scene 101 can be processed separately, and the resulting per-frame atlas and metadata are then stored into separate video and metadata streams, respectively. In some embodiments, the frames of the input 3D scene 101 can be processed using any suitable means, apparatus, or device, such as a codec or processing circuitry (such as discussed below with regard to FIG. 7).

In some embodiments, the input 3D scene 101 is converted, at Input Conversion 102 into a canonical representation for processing. According to some embodiments, each frame of the input 3D scene 101 is converted at Input Conversion 102 into a collection of 3D samples of a scene geometry, at a specified internal processing resolution. Depending on the input 3D scene 101, this may involve, e.g., voxelizing a mesh model, or down-sampling a high resolution point cloud with very fine details into the processing resolution. In some embodiments, the internal representation resulting from the Input Conversion 102 is a point cloud representing some or all aspects of the 3D input scene 101. By way of example only, the aspects of the 3D input scene 101 can include but are not limited to tile attributes such as one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like of the 3D scene 101. In some embodiments, the input 3D scene 101 can be converted into, for example, a canonical representation using any suitable means, apparatus, or device, such as a codec or processing circuitry (such as discussed below with regard to FIG. 7).

In some embodiments, a View Optimizer 103 creates, from the internal point cloud format resulting from the Input Conversion 102, a segmentation of the 3D scene 101 optimized for a specified viewing constraint (e.g., the viewing volume). In some embodiments, the View Optimizer 103 process can involve creating view-tiles that have sufficient coverage and resolution for representing the original input 3D scene 101 while incurring a minimal quality degradation within the given viewing constraints. In some embodiments, the View Optimizer 103 can make use of at least a 3D position of points in the internal point cloud of the 3D scene 101. In some embodiments, additional tile attributes such as a geometry attribute, a reflectance attribute, a roughness attribute, a transparency attribute, a metalness attribute, a specularity attribute, a surface normals attribute, a material attribute of the volumetric video scene, and the like may also or alternatively be considered. In some embodiments, the View Optimizer 103 can be fully or partially instantiated using any suitable means, apparatus, or device, such as a codec or processing circuitry (such as discussed below with regard to FIG. 7).

In some embodiments, as the tiles are defined for each frame of the GoP, View-tile Metadata 104 can be defined that describes each tile of the frame (e.g., tile geometry, material, color, depth, etc.). In some embodiments, the resulting view-tiles can then be pre-rendered in a View-tile Rendering 105. In some embodiments, View-tile Rendering 105 can include resampling the input point cloud into one or more 2D tile projections, and/or calling an external renderer, e.g. a path tracing renderer, to render views of the original input 3D scene 101. In some embodiments, the tiles can be defined, characterized, and/or converted to metadata using any suitable means, apparatus, or device, such as a codec or processing circuitry (such as discussed below with regard to FIG. 7).

In other words, according to some embodiments of the present disclosure, separate layouts of different types of volumetric video component atlases (depth, texture, roughness, normals, etc.) can be generated for a group of frames (GoF), a GoP, one or more frames of the GoF, one or more frames of the GoP, and/or tiles of a particular frame. In some embodiments, using the structures in the corresponding metadata as means for storing atlas, frame, or tile characteristic information allows for the selection of one or more packing strategies based on the characteristics of those components. Since any particular packing strategy may not always work for all components, for example when the packing strategy is only applicable for a single component, such an approach can pick a suitable, preferable, best, optimal or other such packing strategy for a particular volumetric video section, frame, atlas, and/or tile individually. In some embodiments, such an approach can yield a single set of metadata for a plurality of frames while the video atlas contains per-frame data. As such, in some embodiments, a volumetric video preparation and packing approach can take advantage of different metadata for different tile characteristics (e.g., color tiles, geometry tiles, etc.), and can employ different packing strategies for different characteristics depending on the content.

In some embodiments, the rendered tiles can then be input into an Atlas Packer 106. In some embodiments, the Atlas Packer 106 can produce an optimal 2D layout of the rendered view-tiles. In some embodiments, the Atlas Packer 106 can pack the pre-rendered tiles into video frames. In some embodiments, additional metadata may be required to unpack and re-render the packed tiles. In some embodiments, when such metadata is required to unpack and re-render the packed tiles, such additional metadata can be generated by the Atlas Packer 106. In some embodiments, the Atlas Packer 106 can carry out alternative or additional processing procedures such as down-sampling of certain tiles, re-fragmentation of tiles, padding, dilation and the like. In some embodiments, the Atlas Packer 106 can be configured to pack the scene into an atlas format that minimizes unused pixels. In some embodiments, the Atlas Packer 106 can provide guards for artifacts that might occur in a compression stage. In some embodiments, the packed atlases can then be piped to Video Compression 107 to generate a final compressed representation of the 3D scene 101. In some embodiments, the final compressed representation of the 3D scene 101 can include compressed view-tiles 108 and corresponding view-tile metadata 104. In some embodiments, the Atlas Packer 106 and/or the Video Compression 107 can be fully or partially instantiated using any suitable means, apparatus, or device, such as a codec or processing circuitry (such as discussed below with regard to FIG. 7).

In some embodiments, after content pre-processing of the 3D scene 101 into the compressed view-tiles 108 and corresponding view-tile metadata 104, the pipeline 100 can include processes for content delivery and view (e.g., real-time viewing). In some embodiments, in order to produce the tiles in a proper format for viewing, the compressed video frames (compressed view-tiles 108) and the view-tile metadata 104 can be used for View Synthesis 109 of novel views of the 3D scene 101. In some embodiments, the view-tile metadata 104 can contain some or all of the necessary information for View Synthesis 109 (a view synthesizer) to employ any suitable rendering method or combination of rendering methods, such as point cloud rendering, mesh rendering, or ray-casting, to reconstruct a view of the scene from any given 3D viewpoint (assuming the originally specified viewing constraints). In some embodiments, by processing the 3D scene 101 according to the pipeline 100 illustrated in FIG. 1, real-time 3D viewing 110 of the volumetric video can be achieved. In some embodiments, the View Synthesis 109 can be fully or partially instantiated using any suitable means, apparatus, or device, such as a codec or processing circuitry (such as discussed below with regard to FIG. 7).

In some embodiments, the Atlas Packer 106 receives as an input at least a list of views and pre-rendered tiles representing those views for at least depth and color components. However, the Atlas Packer 106 is not limited to color and/or depth components only. Rather, other volumetric video components such as a geometry attribute, a reflectance attribute, a roughness attribute, a transparency attribute, a metalness attribute, a specularity attribute, a surface normals attribute, a material attribute of the volumetric video scene, and the like can be processed using the same or a similar approach. In some embodiments designated GoP by GoP, the Atlas Packer 106 can process some or all components of the volumetric video in parallel, leveraging dependencies between them and outputting one or more individual atlases for each component packed with pre-rendered tiles.

In some embodiments, while the Atlas Packer 106 may leverage dependencies between different volumetric video components, it may also apply compression methods to each component individually, resulting in different atlas layouts and sizes for each component. In some embodiments, therefore, different packing methods can be applied for different components individually or to all or several components separately.

Referring now to FIG. 2, an approach for uniform tile detection of tile attributes such as color is illustrated. In some embodiments, the frame can be subdivided into a plurality of tiles based upon a similar or constant color composition (RGB, YUV, or a similar color schema). In some embodiments, during Atlas Packing 106 for instance, each tile of the frame can be analyzed to find tiles that consist of a single uniform color value or a color value that does not exceed a given default threshold difference over the entire GoP. In some embodiments, by replacing these tiles with static color values in the view-tile metadata 104 and removing the tiles from the atlas, at least the color component pixel rate can be reduced significantly. In FIG. 2, for instance, there are at least six tiles having a first color/shade and at least four other tiles having a second color/shade. In some embodiments, tiles having the same or a similar enough color/shade can therefore be characterized using a single view-tile metadata 104 entry and geometric data related to the size and position of the tile within the frame can be stored in the view-tile metadata 104, rather than all six actual tiles being stored as pixels in the atlas. The compression gains from such an approach will be apparent from the illustrated frame of FIG. 2.

Referring now to FIG. 3, an approach for tile merging based upon tile attributes (e.g., a color attribute) is illustrated. While the approaches described herein may be illustrated for a color attribute, a depth attribute, or the like, the same or similar approaches can be carried out using the same or similar apparatuses and computer program products for any other suitable tile attributes without limitation. In some embodiments the frame can be subdivided into a plurality of tiles based upon a similar or constant color composition (RGB, YUV, or a similar color schema). In some embodiments, during Atlas Packing 106 for instance, each tile of the frame can be analyzed to find tiles that consist of a single uniform color value or a color value that does not exceed a given default threshold difference over the entire GoP. In some embodiments, it is possible to identify one or more smaller tiles that can be fit inside a larger tile, where the one or more smaller tiles and the larger tile have a particular color value or a color value that does not exceed a given default threshold difference over the entire GoP. In other words, if a first tile A has a sufficiently similar color to a second tile B over the entire GoP or the color difference between the first tile A and the second tile B over the entire GoP satisfies, such as by being below, a threshold difference, then tiles A and B can be merged together. In some embodiments, a pixel-by-pixel comparison of the frame can be performed to determine differences between tiles and to identify any instances in which a smaller tile can be fit inside a larger tile having a similar or the same color composition over the entire GoP. In some embodiments, if the smaller tile can be fit within the larger tile and if the color attribute of the tiles over the entire GoP is similar enough, the smaller tile can be removed from the atlas and tile offsets can be set to clip the smaller tile from the atlas during content pre-processing and to generate the smaller tile from the larger tile metadata and atlas tile, e.g., during view synthesis 109 (rendering) for real-time 3D viewing. In some embodiments, this approach may not require any special support from the metadata format and is found to reduce color component pixel rate significantly.

Another approach for content pre-processing and metadata structuring includes, in some embodiments, separation of static tiles and dynamic tiles. In some embodiments, for example during Atlas Packing 106 or another such element of the compression pipeline 100, each frame of the 3D scene 101 can be subdivided into tiles and each tile can be analyzed to determine whether one or more tile attributes remains the same during the entire GoP (static tile) or changes during the entire GoP (dynamic tile). In some embodiments, after determining which, if any, tiles are static tiles during the entire GoP, the view-tile metadata 104 can be updated to include information indicative of tiles that are static tiles. In some embodiments, the view-tile metadata 104 can additionally or alternatively be updated to include information indicative of tiles that are dynamic tiles. In some embodiments, static tiles can be defined more generally as tiles that retain substantially the same position and have a tile attribute that remains within a pre-defined variance during some or all of the GoP. In other words, if a GoP comprises 1,000 frames and a tile remains in the same position and has the same or a similar enough color attribute, texture attribute, depth attribute, material attribute, normals attribute, or the like, over a "substantial" portion of the 1,000 frames of the GoP, then the tile can be considered a static tile. Depending upon the application and the particular needs of the encoding/decoding approach and codec used, the substantial portion can range, by way of example but not of limitation, from greater than about 50% of the frames, to greater than about 95% of the frames, to greater than about 99% of the frames. In some embodiments and for some particular applications, a tile might be characterized as a static tile only when every frame contains the same or a sufficiently similar tile during the entire GoP.

Additionally or alternatively, if one or more tiles are identified as having a tile attribute that is identical or sufficiently identical during only a portion of the GoP, the GoP can be subdivided into two or more GoPs based upon the portion of the GoP in which the one or more tiles are identified as having a tile attribute that is identical or sufficiently identical. By way of example but not of limitation, if a GoP contains 1,000 chronologically ordered frames and a tile has an identical or sufficiently identical tile attribute for the first 500 chronologically ordered frames, then the GoP can be subdivided into a first GoP of frames 1-500 and a second GoP of frames 501-1,000 or the like. In such a way, a single view-tile can be compressed and a single metadata entry can be used for the tile for the first GoP while the tiles can be compressed and characterized in the metadata according to any other suitable approach for the second GoP.

In some embodiments, once tiles are identified as being static or dynamic, the static tiles and dynamic tiles can be treated as their own component videos and flagged as such in the metadata for each tile, thus increasing the total amount of video streams. In such a way, static tiles would need to be streamed only once per GoP since the first instance of the tile is sufficiently identical to be used for each subsequent instance of the tile during rendering. This may result in a intra coded static volumetric video component and a prediction coded dynamic volumetric video component. This approach may also result in reduced bandwidth requirement since the number of video streams increases but the number of frames transmitted in total is decreased. Furthermore, this approach may result in reduced rendering (e.g., real-time 3D viewing) complexity since the static frames need to be rendered only once for the entire GoP.

Referring now to FIG. 4, an approach for calculating a rough core mesh for tiles of frames within a GoP is illustrated. In some embodiments, frames can be subdivided into a plurality of tiles based upon a tile attribute such as color, depth, material, normals, etc. In some embodiments, during Atlas Packing 106 for instance, a meshing algorithm can be used to calculate a rough mesh structure for a depth tile 1000. In some embodiments, the resulting mesh may provide a rough estimation of the depth tile 1000 surface where minor details can be added using differential depth maps. Alternatively or additionally, depth tiles with surfaces that contain no minor details and remain static over the entire GoP often do not need differential depth maps and can be transmitted as mesh only. Without wishing to be bound by any particular theory, storing part of depth data as mesh structures may reduce a depth component bit rate and/or improve view synthesis quality. In some embodiments, a depth mesh layout may be represented in a number of ways, e.g., as a number of vertices with explicit topology, as a regular grid of M×N vertices with implicit triangle strip topology, as a triangle fan originating at one corner of the view, and/or the like. In some embodiments, the mesh data can be supported by a particular metadata format. For instance, in some embodiments, a tile can be defined by an algorithmic approach as a series of vertices, edges, surfaces, and the like. As illustrated in FIG. 4, the depth tile 1000 can be roughly replaced with five vertices, 1001, 1002, 1003, 1004, and 1005. In some embodiments, the information related to the depth tile 1000 can refer to the position of one or more vertices within the frame and the position within the frame or position relative to the one or more vertices of one or more other vertices. In other words, in some embodiments the absolute position of vertex 1001 can be stored in the metadata for the depth tile 1000 and the position (distance, direction, etc.) of vertices 1002, 1003, 1004, and/or 1005 relative to vertex 1001 can be stored in the metadata for the depth tile 1000 such that the tile can be cut out from the atlas, for at least the one frame if not for a larger portion of the GoP or the entire GoP, and rendering can subsequently recreate the tile for the one or more proper frames according to the vertex information in the metadata.

As illustrated in FIG. 5, a depth tile 2000 can consist of a flat plane that can be compressed by using simpler and/or more well-known formats to represent planes, such as: $ax+by+cz+d=0$. In some embodiments, therefore, only four vertices 2001, 2002, 2003, and 2004 may be required to encode the depth tile 2000 as a single plane. In some embodiments, this may allow for the removal of the depth-tile from the atlas and allow for the tile to be carried (stored) as metadata only, as it can be generated during the decoding process based upon only the metadata.

As illustrated in FIGS. 6A and 6B, an approach for calculating a rough core mesh for tiles of frames within a GoP is illustrated. In some embodiments, frames can be subdivided into a plurality of tiles based upon a tile attribute such as color, depth, material, normals, etc. In some embodiments, during Atlas Packing 106 for instance, a depth tile 3000A consisting of a flat surface can be down scaled to a down-sampled depth tile 3000B. In some embodiments, the depth tile 3000A includes vertices 3001, 3002, 3003, and 3004 that are connected to define four edges, 3005, 3006, 3007, and 3008. In some embodiments, a scaling factor or other specific value can be used to down-sample the tile 3000A to form a down-sampled tile 3000B. In some embodiments, down-sampling can result in the movement of one or more vertices relative to the original depth tile 3000A. For example, by down-sampling the depth tile 3000A to form the down-sampled tile 3000B, vertices 3001, 3002, 3003, and 3004 are redefined as vertices 3001', 3002', 3003', and 3004', respectively. By way of example only, as illustrated in FIGS. 6A and 6B, down-sampling the depth tile 3000A results in a depth tile 3000B in which vertex 3001' has a different relative position than vertex 3001, vertex 3003' has a different relative position than vertex 3003, and vertex 3004' has a different relative position than vertex 3004. Likewise, by down-sampling the depth tile 3000A to form the down-sampled tile 3000B, edges 3005, 3006, 3007, and 3003 are redefined as edges 3005', 3006', 3007', and 3008', respectively. By way of example only, as illustrated in FIGS. 6A and 6B, down-sampling the depth tile 3000A results in a depth tile 3000B for which all edges 3005', 3006', 3007', and 3008' have a length that is different from the original respective edges 3005, 3006, 3007, and 3008.

In some embodiments, an algorithm (e.g., an edge detection algorithm) can be used to evaluate edges from the depth tile 3000A to decide whether down sampling can be applied. In some embodiments, down sampling depth tiles that contain edges can result in suboptimal view synthesis. Therefore, in some embodiments, edge detection is performed before down sampling. In some embodiments, an algorithm (e.g., an edge detection algorithm) can be used to calculate gradients over depth tiles using any desired kernel size. In some embodiments, if calculated gradients exceed a predefined threshold value for a particular tile, that tile cannot be down sampled. In some embodiments, if a particular tile is found to contain no edges, down sampling can be performed using a predefined scaling factor. In some embodiments, such an approach does not require a particular metadata format.

In other words, according to some embodiments of the present disclosure, a method can include separating layouts of different types of volumetric video component atlases (depth, texture, roughness, normals, etc.). In some embodiments, using the structures in the corresponding metadata as means for storing atlas, frame, or tile characteristic information allows for the selection of one or more packing strategies based on the characteristics of those components. Since any particular packing strategy may not always work for all components, for example when the packing strategy is only applicable for a single component, such an approach can pick a suitable, preferable, best, optimal or other such packing strategy for a particular volumetric video section, frame, atlas, and/or tile individually. In some embodiments, such an approach can yield a single set of metadata for a plurality of frames while the video atlas contains per-frame data. As such, in some embodiments, a volumetric video preparation and packing approach can take advantage of different metadata for different tile characteristics (e.g., color tiles, geometry tiles, etc.), and can employ different packing strategies for different characteristics depending on the content.

An alternative approach for volumetric video compression can include further separation of color and depth tiles (among other tile types) by the View Optimizer 103, in which case the view data is not shared between color and depth tiles. As a result of applying any of the above packing methods, component atlases can be smaller and may not share the same tile layout. In some embodiments, information describing layouts of different component streams may be essential for reconstructing views at the View Synthesizer 109 and, as such, need to be incorporated in a standard metadata format.

Described below are examples of metadata structures that may support some or all of the disclosed packing methods using some or all of the disclosed apparatuses and/or computer program products. The actual bit depths of individual fields may naturally be different, and floating point values may be quantized to different fixed-point precisions.

Code 1 provides for an approach to determine tile size and position within a frame and reversible relative positioning actions that can enable improved packing of tiles.

Code 1

```
struct Tile {
    uint16_t offset_x;
    uint16_t offset_y;
    uint16_t width;
    uint16_t height;
    bool rotated;
    bool flipped;
    bool static;
};
``` offset_x describes tile offset on the atlas from the left side of the image as pixels.

offset_y; describes tile offset on the atlas from the top of the image as pixels.

width describes the tile width in pixels.

height describes the tile height in pixels.

rotated indicates if a first rotation, e.g., a default 90 degree rotation, needs to be applied to View rotation during view synthesis. This function can be used to improve atlas packing performance by aligning similar tile-edges.

flipped indicates if a second rotation, e.g., a default 180 degree rotation, needs to be applied to View rotation during view synthesis; can be used to improve atlas packing performance by aligning similar tile-edges.

static indicates if the tile remains static over the entire GoP.

Code 2 provides for an approach for storing information relative to the position of the virtual camera for purposes of orienting the tile and the corresponding frame in the 3D view representation, determining and storing tile color and depth attributes, mesh characteristics, and metadata relative to orthogonal projection.

Code 2

```
struct View {
    float depth_range_max;
    float location[3];
    float rotation_quat[4];
    float ortho_max_dim;
    Tile color_tile;
```

-continued

Code 2

```
Tile geometry_tile;
    uint16_t color[3];
    uint8_t depth_mesh_type;
    union {
        struct Mesh {
            unsigned int depth_vertex_count;
            unsigned int depth_index_count;
            float depth_indices[depth_index_count][3];
        }
        struct GridMesh {
            unsigned int depth_grid_width;
            unsigned int depth_grid_height;
            unsigned int depth_vertex_count = depth_grid_width *
                depth_grid_height;
        }
        struct FanMesh {
            unsigned int depth_vertex_count;
            uint8_t depth_fan_corner;
        }
        float depth_vertices[depth_vertex_count][3];
        float plane[4];
    };
``` depth_range_max indicates the maximum depth range for the view. Default minimum depth range is 1.0.

location[3] describes the location of the virtual camera for the view. Indices 0, 1 and 2 match to x, y and z coordinates respectively.

rotation_quat[4] describes the rotation quaternion of the virtual camera of the view. Indices 0, 1, 2 and 3 match to w, x, y and z components of the quaternion.

ortho_max_dim describes the maximum dimension of orthogonal projection.

color_tile contains color tile data for the view.

geometry_tile contains depth tile data for the view.

uniform_color[3] if the color tile is uniform, this contains the default color for the tile as Y, U and V or R, G and B values. If the tile is not uniform, it contains 0, 0 and 0.

depth_mesh_type indicates the type of depth mesh data, if any.

Mesh, GridMesh, and FanMesh are examples of possible depth mesh types.

depth_vertex_count indicates if the tile can be represented by rough core mesh and stores the number of depth vertices.

depth_vertices store [x,y,z] coordinates for each depth vertex.

plane[4] in case of a flat depth plane, a tile can be represented with four values as per: ax+by+cz+d=0, where a, b, c and d are stored in indices 0, 1, 2 and 3.

In some embodiments, additional components of volumetric video may have their own tiles in the View structure.

Code 3 provides for an approach for storing tile views during the GoP in order to further determine whether the tile is static or dynamic, among other functions.

Code 3

```
struct GOP_Metadata {
    unsigned int view_count;
    View views[view_count];
};
``` view_count indicates the number of views in the GoP metadata.

views contain an array with view data for the GoP.

In some embodiments, it is possible to further separate different components of volumetric video on the view level. This will introduce updates to the metadata structures, such as the following.

For instance, Code 4 provides for an approach for determining whether a tile is static or dynamic, determining and storing tile color and depth attributes, determining whether a tile remains within a predetermined color or depth attribute range during the GoP, and storing information related to the position of the virtual camera for purposes of orienting the tile and the corresponding frame in the 3D view representation.

Code 4

```
struct GOP_Metadata {
    unsigned int color_view_count;
    ColorView color_views[color_view_count];
    unsigned int depth_view_count;
    DepthView color_views[depth_view_count];
};
struct DepthView {
    Tile tile;
    float depth_range_max;
    float location[3];
    float rotation_quat[4];
    float ortho_max_dim;
    unsigned int depth_vertex_count;
    float depth_vertices[depth_vertex_count][3];
    float plane[4];
};
struct ColorView {
    Tile tile;
    float location[3];
    float rotation_quat[4];
    float ortho_max_dim;
    uint16_t color[3];
};
struct Tile {
    uint16_t offset_x;
    uint16_t offset_y;
    uint16_t width;
    uint16_t height;
    bool static;
};
```

In some embodiments, additional camera projections may be supported. In some embodiments, an approach for representing camera models is to store them as 4×4 matrices, which contain location, rotation and projection information. In some embodiments, for instance, the camera information can be used to render the representation in a manner consistent with a desired (e.g., more "natural") visual perspective and orientation.

For instance, Code 5 provides for an approach for storing camera model data commonly used in graphics such that the camera information can be used during rendering or 3D viewing of the projection (representation).

Code 5:

```
struct View {
    float camera_model[4][4];
    Tile color_tile;
    Tile geometry_tile;
    uint16_t color[3];
    unsigned int depth_vertex_count;
    float depth_vertices[depth_vertex_count][3];
};
``` camera_model contains camera model data as commonly used in graphics.

In some embodiments, another approach includes adding support for perspective camera models by adding focal length and sensor size information in the View-structure.

For example, Code 6 provides for an approach for storing camera settings and image capture parameters. In some embodiments, for instance, the camera settings and image capture parameters can be used to render the representation in a manner consistent with a desired (e.g., more "natural") visual perspective and orientation.

---
Code 6:
---

```
struct View {
    float depth_range_max;
    float location[3];
    float rotation_quat[4];
    float ortho_max_dim;
    float focal_length;
    float sensor_size;
    Tile color_tile;
    Tile geometry_tile;
    uint16_t color[3];
    unsigned int depth_vertex_count;
    float depth_vertices[depth_vertex_count][3];
    float plane[4];
};
``` focal_length indicates value for perspective lens in millimeters.

sensor_size indicates value for the largest camera sensor dimension in millimeters.

It should be noted that data types defined here are provided by way of example only and are not intended to limit the scope of the disclosure in any way. Furthermore, the data types provided here can be represented in an alternative, e.g., a more compact form, in actual implementation. Also, to reduce the amount of redundant view data, common view data could be defined in a virtual list which is referenced by actual views. In some embodiments, the metadata structure can be similar to an embodiment described herein, or alternatively the metadata structure can be compressed according to any approach described herein.

In some embodiments, an apparatus can be configured to carry out some or all portions of any of the methods described herein. The apparatus may be embodied by any of a wide variety of devices including, for example, a video codec. A video codec includes an encoder that transforms input video into a compressed representation suited for storage and/or transmission and/or a decoder that can decompress the compressed video representation so as to result in a viewable form of a video. Typically, the encoder discards some information from the original video sequence so as to represent the video in a more compact form, such as at a lower bit rate. As an alternative to a video codec, the apparatus may, instead, be embodied by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by an image capture system configured to capture the images that comprise the volumetric video data.

Regardless of the video codec or other type of computing device that embodies the apparatus, the apparatus 10 of an example embodiment is depicted in FIG. 7 and includes, is associated with, or is otherwise in communication with processing circuitry 12, a memory 14 and a communication interface 16. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 30 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring again to FIG. 1, the operations can be performed or partially performed by means such as the apparatus 10 of FIG. 7 to compress volumetric video data according to any of the methods described herein. In some embodiments, the apparatus 10 can include means, such as the processing circuitry 32, the communication interface 36, the memory 34 or the like for receiving volumetric video data, such as a point cloud data representing one or more 3D surfaces. The volumetric video data, such as the point cloud data, is segmented and projected into tiles. In this regard, the apparatus 10 of an example embodiment includes means, such as a processing circuitry 12 or the like, for segmenting the volumetric video data and projecting the volumetric video data into tiles.

In relation to the segmentation of the volumetric video data, such as the point cloud data, into a plurality of tiles, the apparatus 10, such as the processing circuitry 12, of an example embodiment is configured to decompose the volumetric video data into a plurality of tiles, such as a minimum number of tiles, having smooth boundaries while also taking into account, such as reducing or minimizing, the reconstruction error. In an example embodiment, the tiles are generated by initially estimating the normal at every point in the 3D space. The points of the volumetric video data are then initially clustered by associating each point with one of the following six oriented planes, as defined by their respective normals:

(1.0, 0.0, 0.0)
(0.0, 1.0, 0.0)
(0.0, 0.0, 1.0)
(−1.0, 0.0, 0.0)
(0.0, −1.0, 0.0)
(0.0, 0.0, −1.0)

As a result, each point has volumetric video data that is associated with the plane that has the closest normal, thereby maximizing the dot product of the normal for the point from the volumetric video data and the normal to the plane. The apparatus 10, such as the processing circuitry 12, of an example embodiment then refines the initial clustering by iteratively updating the cluster index associated with each point based on its normal in the cluster indices of its nearest neighbors. The apparatus 10, such as a processing circuitry 12, then extracts tiles by applying a connected component extraction procedure. As such, a tile is created from the points that have similar normal and, in some embodiments, a tile is created so as to be as large as possible so long as the normals to the points extend in a similar direction such that the points that comprise the tile project to the same depth plane, e.g., the same x/y/z depth plane.

As described above, in projection-based volumetric video compression, a 3D surface can be represented by the volumetric video data and can be projected onto a 2D grid. As a result of the finite resolution of the 2D grid, two or more points of the 3D surface may be projected to the same 2D pixel location. As such, two depth layers may be generated per temporal instance in order to capture each of the points of the 3D surface that are projected onto the same pixel of the 2D grid. Each of the two projections are at a different depth, thereby separately representing the different points of the 3D surface that are projected onto the same point of the 2D grid. Consequently, the projection of the volumetric video data onto a 2D grid results in the generation of a plurality, such as two, depth layers, each providing a different depth image representation. For example, a first depth layer, such as a near or min layer, that stores the points that have been projected with the minimum depth and a second depth layer, such as a far or max layer, that stores the points that have been projected with the greatest depth within the interval [D0, D0+Δ] where Δ is a user-defined parameter that describes the surface thickness, can be generated.

In order to efficiently represent the volumetric video data while preserving the depth information provided by the multiple projections of the volumetric video data from the 3D space to the 2D grid, the apparatus 10 of an example embodiment can include means, such as the processing circuitry 12, to generate tiles and/or sub tiles for those areas for which the depth information provided by the projections varies appreciably so as to retain the useful depth information without creating sub tiles or otherwise retaining information regarding other areas in which the differences in the depth of the projections is negligible. The tiles and the sub tiles may then be encoded in a single image so as to avoid the generation of multiple images to represent the different depth layers.

In some embodiments, the apparatus 10 can include means, such as the processing circuitry 12 or the like, for evaluating each tile into which a point cloud representative of volumetric video data has been decomposed. In this regard, the apparatus 10, such as the processing circuitry 12, is configured to evaluate the tile so as to identify any areas within the respective tile for which the difference in depth values between corresponding pixels of the multiple depth planes satisfy a predefined threshold, such as by exceeding a predefined threshold. For an area within the respective tile that has been identified as having a difference in depth values between corresponding pixels of the depth planes that satisfies a predefined threshold, the apparatus of this example embodiment includes means, such as the processing circuitry or the like, for generating a sub tile representative of the depth values of one of the depth planes. In this regard, in an instance in which the projection of the 3D volumetric video data onto a 2D grid results in the generation of first and second depth planes having pixels representative of different depth values, such as a first depth plane representative of the minimum depth at which points from the volumetric video data are projected onto a corresponding point on the 2D grid and a second depth plane representative of the maximum depth at which points of the volumetric video data are projected onto the same point of the 2D grid, the tiles that have been generated may be based upon the points that have been projected onto one of the depth planes, such as the first depth plane. In this example, the sub tile that is generated (from an area within a respective tile) is representative of the depth values of the second depth plane, that is, the other depth plane relative to the first depth plane upon which the respective tile is generated. Conversely, if the respective tile has been generated based upon the second depth layer in the foregoing example, the sub tile would be generated based upon the first depth plane. Although the sub tiles may be generated in various manners, the sub tiles may be generated in the same manner as described above in conjunction with the generation of tiles.

In some embodiments, the apparatus 10 may also include means, such the processing circuitry 12 or the like, for packing the tiles onto a 2D grid. In this regard, the tiles are packed by mapping the tiles, including the one or more tiles into which the volumetric video data has been decomposed and the sub tiles that have been generated, to a grid, such as a 2D grid, while, in an example embodiment, minimizing the unused space and guaranteeing that every block, such as every 16 pixel×16 pixel block, of the 2D grid is associated with a unique tile. The size of the blocks may be defined by the user and encoded into the bit stream that provides the volumetric video data.

In some embodiments, the apparatus 10 may also include means, such the processing circuitry 12 or the like, for generating an occupancy map. The occupancy map indicates which pixels of the resulting grid have valid depth values and, conversely, which pixels do not have valid depth values. Thereafter, the apparatus includes means, such as a processing circuitry or the like, for generating an image of the tile and sub tiles so as to represent the volumetric video data, albeit in a compressed representation. By generating a single image that includes both the tiles and sub tiles, the single image may include the depth information from both depth layers, thereby allowing the volumetric video data to be more efficiently encoded while still capturing the depth information conveyed by the two different depth layers.

As volumetric video data generally includes both geometry and texture, the process described herein may be performed separately for the geometry information provided by the volumetric video data and for the texture information provided by the volumetric video data, thereby resulting in one image representative of the geometry of the volumetric video data, another image representative of the texture of the volumetric video data and a third image of the occupancy map. In each instance, however, a single image is generated for the geometry and a single image is generated for the texture, while retaining the depth information provided by the two depth layers that are generated during the projection of the volumetric video data onto a 2D grid. The resulting image may then be padded, compressed, and multiplexed into a bit stream for transmission. Additionally or alternatively, the resulting image may be stored, such as in memory 34 or in another database in communication with the apparatus.

Metadata may be associated with the tiles and sub tiles and, in an example embodiment, the metadata may provide information regarding the relationship between a tile and the one or more sub tiles generated from areas within a respective tile. By including this metadata, the resulting image may thereafter be decoded in such a way that the decoding of the tiles and sub tiles proceeds as intended with the relationship between the sub tiles and the corresponding tile defined by the metadata. Although various types of metadata may be associated with a tile or sub tile, the apparatus 10 of an example embodiment includes means, such as the processing circuitry 12 or the like, for associating metadata with the sub tile that includes parent tile information that identifies the respective tile from which the sub tile was generated. In an example embodiment, the apparatus also includes means, such as the processing circuitry or the like, for associating metadata with the sub tile that includes sub tile location information that identifies the location of the sub tile in relation to the respective tile from which the sub tile was generated. Additionally or alternatively, the apparatus of an example embodiment includes means, such as the processing circuitry or the like, for associating metadata with the respective tile including children information that identifies the one or more sub tiles that were generated from the respective tile.

The identification of one or more areas within a respective tile for which the difference in depth values between corresponding pixels of the different depth planes satisfies a predefined threshold may be performed in various manners. In an example embodiment in which the 2D grid is comprised of a plurality of blocks, the apparatus 30 of an example embodiment includes means, such as the processing circuitry 12 or the like, for evaluating a tile by separately evaluating each block of the respective tile to identify if the area of the tile defined by the block includes depth planes for which the difference in depth values between corresponding pixels satisfy the predefined threshold. For example, a 2D grid may be divided into blocks, such as blocks sized to be 16 pixels×16 pixels, the apparatus, such as the processing circuitry, may add the differences in depth values for each pixel within the block and then compare the resulting sum representing the cumulative difference in depth values to the predefined threshold. In an instance in which the cumulative difference in the depth values exceeds the predefined threshold, an area for which a sub tile is to be generated is identified, while those blocks for which the cumulative difference in depth values fails to satisfy the predefined threshold, such as by being less than the predefined threshold, are not identified as an area for which a sub tile is to be generated. In the foregoing example, Area 1 of FIG. 10 was identified in accordance with this example embodiment that evaluates differences in pixel values for the pixels of a block of the 2D grid. In an example embodiment, the apparatus, such as the processing circuitry, is configured to combine adjacent or neighboring blocks that are also separately identified to have a cumulative difference in the depth values that exceed the predefined threshold such that all adjacent or adjoining blocks that are separately determined to have a cumulative difference in depth values that exceeds the predefined threshold are grouped together and identified as a single area for which a sub block is to be generated.

In an alternative embodiment, the apparatus 10 can include means, such as the processing circuitry 12, configured to identify one or more areas within a respective tile for which a sub tile is to be generate by utilizing contour based sub tile generation. In some embodiments, the apparatus 10 can include means, such as the processing circuitry 12 or the like, for identifying one or more pixels within the respective tile for which the difference in the depth values of the different depth planes satisfies a predefined threshold. In this regard, the apparatus can include means, such as the processing circuitry, to evaluate the pixels of the tile on a pixel-by-pixel basis and can compare the depth values associated with corresponding pixels of the different depth planes in order to identify those pixels for which the difference in depth values satisfies the predefined threshold, such as by exceeding the predefined threshold. In one example embodiment, the differences in the depth values are scaled so as to be represented by 0, 1, 2 or 3 with a difference of 0 representing no difference in depth values between the different depth planes, a difference of 1 representing a rounding error between the original volumetric video data point and the projection thereof, and difference values of 2 and 3 representing more significant differences in depth values that satisfy the predefined threshold.

In some embodiments, such as illustrated in the flow chart of FIG. 8, the apparatus 10 can include means, such as the processing circuitry 12, configured to carry out a method 20 to convert volumetric video scene into a canonical representation comprising a plurality of frames, at 21. In some embodiments, the apparatus 10 can include means, such as the processing circuitry 12, configured to process separately each frame of the plurality of frames of the canonical representation to yield for each frame a video atlas and corresponding metadata, at 22. In some embodiments, the apparatus 10 can include means, such as the processing circuitry 12, configured to analyze a plurality of tiles of each frame of the plurality of frames to identify two or more tiles having a tile characteristic that has a difference value that satisfies, such as by being below, a predetermined threshold, at 23. In some embodiments, the apparatus 10 can include means, such as the processing circuitry 12, configured to replace the two or more tiles with static characteristic values in the corresponding metadata, at 24. In some embodiments, the apparatus 10 can include means, such as the processing circuitry 12, configured to cause storage of the video atlas and the corresponding metadata separately as a video stream and a metadata stream, respectively, at 25. In some embodiments, the apparatus 10 can include means, such as the processing circuitry 12, configured to convert, at a specified internal processing resolution, each frame of the video stream into a 3D sample of a scene geometry, at 26.

In some embodiments, the converting includes one of voxelizing a mesh model and down-sampling a high resolution point cloud. In some embodiments, the canonical representation can include a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the tile characteristic can be one of a color attribute, a geometry attribute, a surface normals attribute, or a material attribute of the volumetric video scene.

In some embodiments, such as illustrated in the flow chart of FIG. 9, the apparatus 10 can include means, such as the processing circuitry 12, configured to carry out a method 30 to convert the volumetric video scene into a canonical representation comprising a plurality of frames, at 31, and to process separately each frame of the plurality of frames of the canonical representation to yield for each frame a video atlas and corresponding metadata, at 32. In some embodiments, the apparatus 10 can include means, such as the processing circuitry 12, configured to analyze a plurality of tiles of each frame of the plurality of frames to identify two or more tiles having a tile characteristic that has a difference value that satisfies, such as by being below, a predetermined threshold, at 33. In some embodiments, the apparatus 10 can include means, such as the processing circuitry 12, configured to determine whether at least some of the two or more tiles can be merged to reduce the number of different tiles, at 34. In some embodiments, in an instance in which it is determined that at least two of the two or more tiles can be merged, the apparatus 10 can include means, such as the processing circuitry 12, configured to clip at least a first tile from the video atlas and reset the tile offsets for a second tile such that the reset tile offsets for the second tile correspond to a portion of the frame occupied by the first tile and the second tile, at 35. In some embodiments, the apparatus 10 can include means, such as the processing circuitry 12, configured to cause storage of the video atlas and the corresponding metadata separately as a video stream and a metadata stream, respectively, at 36, and convert, at a specified internal processing resolution, each frame of the video stream into a 3D sample of a scene geometry, at 37.

In some embodiments, such as illustrated in the flow chart of FIG. 10, the apparatus 10 can include means, such as the processing circuitry 12, configured to carry out a method 40 to convert the volumetric video scene into a canonical representation comprising a plurality of frames, at 41, and process separately each frame of the plurality of frames of the canonical representation to yield for each frame a video atlas and corresponding metadata, at 42. In some embodiments, the apparatus 10 can include means, such as the processing circuitry 12, configured to determine, for a plurality of tiles of each frame of the plurality of frames, whether each tile of the plurality of tiles is a static tile or a dynamic tile, at 43. In some embodiments, the apparatus 10 can include means, such as the processing circuitry 12, configured to flag the static tiles in the metadata, at 44. In some embodiments, the apparatus 10 can include means, such as the processing circuitry 12, configured to cause storage of the static tiles from the video atlas, the dynamic tiles from the video atlas, and the corresponding metadata separately as a first video stream, a second video stream, and a metadata stream, respectively, at 45. In be configured to convert, at a specified internal processing resolution, each frame of the video stream into a 3D sample of a scene geometry, at 46.

In some embodiments, such as illustrated in the flow chart of FIG. 11, the apparatus 10 can include means, such as the processing circuitry 12, configured to carry out a method 50 to convert the volumetric video scene into a canonical representation comprising a plurality of frames, each frame comprising a plurality of tiles, at 51, and process separately each frame of the plurality of frames of the canonical representation to yield for each frame a video atlas and corresponding metadata, at 52. In some embodiments, the apparatus 10 can include means, such as the processing circuitry 12, configured to determine whether a tile of the plurality of tiles is a depth tile, at 53. In some embodiments, in an instance in which the tile of the plurality of tiles is determined to be a depth tile, the apparatus 10 can include means, such as the processing circuitry 12, that can, optionally, be configured to determine whether the tile is a static tile or a dynamic tile, at 54. In some embodiments, for example in an instance in which the tile is a static tile, the apparatus 10 can include means, such as the processing circuitry 12, configured to cause storage of the depth tile portion of the frame as a mesh structure comprising one of a number of vertices with explicit topology, a regular grid of M×N vertices with implicit triangle strip topology, or a triangle fan originating at a corner of the depth tile, at 55. A rough core mesh can be estimated from a sequence of depth tiles and the small depth variations can be difference encoded in the tile metadata itself, enabling generation of a more detailed temporal depth map. This approach may require both the rough mesh and the depth tile. If the tile remains static over the entire GoP, there may not be a need for the temporal difference maps, and as such can be removed from the atlas. In some embodiments, the apparatus 10 can include means, such as the processing circuitry 12, configured to cause storage of the video atlas and the corresponding metadata separately as a video stream and a metadata stream, respectively, at 56. In some embodiments, the apparatus 10 can include means, such as the processing circuitry 12, configured to convert, at a specified internal processing resolution, each frame of the video stream into a 3D sample of a scene geometry, at 57.

Whatever the packing approach used, following transmission and/or storage of the resulting encoded image, the image may be decoded, such as for display or other presentation. The image may be decoded by an apparatus 10 that is embodied by the same apparatus as that which encoded the volumetric video data as described above, such as a video codec or other computing device, or by a different device, such as a VR, AR or MR system, such as a VR, AR or MR headset, capable of receiving one or more data streams and rendering visual and audiovisual content that can be presented to a user. Optionally, in some embodiments in which the apparatus is configured to process the compressed representation and render the volumetric video data, visual, and/or audiovisual content in the form of video or image files, the apparatus configured to decode the resulting image may also include a user interface that may, in turn, be in communication with the processing circuitry 12 to provide output to the user, such as by rendering the visual content in the form of video or image files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

In this example embodiment, the apparatus 10 of this example embodiment includes means, such as the processing circuitry 12, the communication interface 16, the memory 14 or the like, for receiving an image, such as an encoded and/or compressed image in which volumetric video data has been encoded as a plurality of tiles and sub tiles projected onto a 2D grid. In this example embodiment, the apparatus also includes means, such as the processing circuitry or the like, for decoding one or more tiles that fail to include parent tile information identifying a respective tile from which the one or more tiles were generated. Thus, the metadata associated with a tile is evaluated to determine if the metadata includes parent tile information that would indicate that the tile is, in fact, a sub tile or another tile.

In an instance in which the metadata associated with a tile does not include parent tile information, the tile is decoded in a conventional manner. However, for each of a plurality of pixels of a sub tile that does include parent tile information as well as sub tile location information that identifies the location of the sub tile in relation to the respective tile from which the sub tile was generated, the apparatus 10 includes means, such as the processing circuitry 12 or the like, for comparing depth values of the pixel of the sub tile and a corresponding pixel of the tile from which the sub tile was generated to determine a difference therebetween. Thus, a sub tile is compared on a pixel-by-pixel basis with the corresponding portion of the tile from which the sub tile was generated and the difference in pixel values between the sub tile and the corresponding portion of the tile is determined.

In an instance in which the difference satisfies a predefined threshold indicative of a variation therebetween, the apparatus 10 includes means, such as the processing circuitry 12 or the like, for decoding the pixel of the sub tile. Thus, in an example embodiment in which the difference between the pixel values exceeds a predefined threshold and, as such, is considered significant, the corresponding pixel of the sub tile is decoded. However, in an instance in which the difference fails to satisfy the predefined threshold, such as in an instance in which the difference between the pixel values is smaller, the apparatus includes means, such as the processing circuitry or the like, for discarding the pixel of the sub tile without decoding the pixel, thereby increasing the efficiency with which the resulting image is decoded by only decoding those subpixels that provide meaningful information regarding differences with respect to corresponding pixels of the tile that has been or will be decoded. The result from the decoding of the tile and certain sub tiles is then combined and the resulting image may be presented, displayed, stored or the like.

As noted above with respect to the encoding process, a single image is therefore encoded and correspondingly decoded that includes information from each of the plurality of the depth planes including the different depth information or at least that depth information that is material so as to increase the efficiency of the encoding and decoding processes. As the volumetric video data typically includes both geometry and texture, the encoding process may encode a single image representative of both depth planes for the geometry and a single image representing both depth planes for the texture and, in some embodiments, an image of the occupancy map. Correspondingly, the decoder may decode a single image representative of both depth planes for the geometry and a single image representative of both depth planes for the texture.

As described above, FIGS. 8, 9, 10 and 11 are flowcharts of methods that can be carried out by an apparatus according to related computer program products comprising computer program code. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of at least FIGS. 1, 8, 9, 10, and 11. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

A method, apparatus, and computer program product are provided in accordance with an example embodiment to compress volumetric video data and to signal of associated metadata packed according to various packing methods. In some embodiments, a method can include separating one or more layouts based on a type for a plurality of volumetric video component atlases. In some embodiments, the method can include determining one or more atlas characteristics of each of one or more volumetric video component atlases of the plurality of volumetric video component atlases. In some embodiments, the method can include causing storage of information indicative of the one or more atlas characteristics of at least one volumetric video component atlas of the plurality of volumetric video component atlases as corresponding metadata. In some embodiments, the method can include determining one or more suitable packing strategies from among a plurality of packing strategies based on the one or more atlas characteristics. In some embodiments, the method can include converting, at a specified internal processing resolution, a volumetric video scene into a three dimensional (3D) sample of a scene geometry. In some embodiments, the method can include voxelizing a mesh model of a volumetric video and down-sampling a high resolution canonical representation. In some embodiments, the method can include providing a canonical representation comprising one of a point cloud, a voxelized mesh model, a 360-video, a face-vertex mesh, a winged-edge mesh, a half-edge mesh, a quad-edge mesh, a corner-table mesh, and a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, or a material attribute of the volumetric video scene.

In some embodiments, an apparatus can include at least one processor and at least one memory including computer program code for one or more programs. In some embodiments, the at least one memory and the computer program code can be configured to, with the at least one processor, cause the apparatus at least to separate one or more layouts based on a type for a plurality of volumetric video component atlases. In some embodiments, the at least one memory and the computer program code can be configured to, with the at least one processor, cause the apparatus at least to determine one or more atlas characteristics of each of one or more volumetric video component atlases of the plurality of volumetric video component atlases. In some embodiments, the at least one memory and the computer program code can be configured to, with the at least one processor, cause the apparatus at least to cause storage of information indicative of the one or more atlas characteristics of at least one volumetric video component atlas of the plurality of volumetric video component atlases as corresponding metadata. In some embodiments, the at least one memory and the computer program code can be configured to, with the at least one processor, cause the apparatus at least to determine one or more suitable packing strategies from among a plurality of packing strategies based on the one or more atlas characteristics.

In some embodiments, an apparatus can include means, such as processing circuitry and/or a memory device, for determining one or more atlas characteristics of each of one or more volumetric video component atlases of the plurality of volumetric video component atlases. In some embodiments, an apparatus can include means for causing storage of information indicative of the one or more atlas characteristics of at least one volumetric video component atlas of the plurality of volumetric video component atlases as corresponding metadata. In some embodiments, an apparatus can include means for determining one or more suitable packing strategies from among a plurality of packing strategies based on the one or more atlas characteristics. In some embodiments, an apparatus can include means for converting, at a specified internal processing resolution, a volumetric video scene into a three dimensional (3D) sample of a scene geometry. In some embodiments, the apparatus can include means for voxelizing a mesh model of a volumetric video and down-sampling a high resolution canonical representation. In some embodiments, an apparatus can include means for providing a canonical representation comprising one of a point cloud, a voxelized mesh model, a 360-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, or a material attribute of the volumetric video scene.

In some embodiments, a computer program product can include at least one non-transitory computer-readable storage medium having computer executable program code instructions stored therein. In some embodiments, the computer executable program code instructions can include program code instructions configured, upon execution, to at least separate one or more layouts based on a type for a plurality of volumetric video component atlases. In some embodiments, the computer executable program code instructions can include program code instructions configured, upon execution, to determine one or more atlas characteristics of each of one or more volumetric video component atlases of the plurality of volumetric video component atlases. In some embodiments, the computer executable program code instructions can include program code instructions configured, upon execution, to cause storage of information indicative of the one or more atlas characteristics of at least one volumetric video component atlas of the plurality of volumetric video component atlases as corresponding metadata. In some embodiments, the computer executable program code instructions can include program code instructions configured, upon execution, to determine one or more suitable packing strategies from among a plurality of packing strategies based on the one or more atlas characteristics.

In some embodiments, a method can include converting a volumetric video scene into a canonical representation. In some embodiments, the method can further include processing each frame of a plurality of frames of the canonical representation to yield a video atlas and corresponding metadata for the plurality of frames. In some embodiments, the method can further include determining, for a plurality of tiles of each frame of the plurality of frames, one or more tile characteristics. In some embodiments, the method can further include structuring the corresponding metadata to include information indicative of the one or more tile characteristics. In some embodiments, the method can further include altering the video atlas to facilitate an efficient packing strategy.

In some embodiments, an apparatus can include at least one processor and at least one memory including computer program code for one or more programs. In some embodiments, the at least one memory and the computer program code are configured to, with the at least one processor, cause the apparatus at least to convert a volumetric video scene into a canonical representation. In some embodiments, the at least one memory and the computer program code are configured to, with the at least one processor, cause the apparatus at least to process each frame of a plurality of frames of the canonical representation to yield a video atlas and corresponding metadata for the plurality of frames. In some embodiments, the at least one memory and the computer program code are configured to, with the at least one processor, cause the apparatus at least to determine, for a plurality of tiles of each frame of the plurality of frames, one or more tile characteristics. In some embodiments, the at least one memory and the computer program code are configured to, with the at least one processor, cause the apparatus at least to structure the corresponding metadata to include information indicative of the one or more tile characteristics. In some embodiments, the at least one memory and the computer program code are configured to, with the at least one processor, cause the apparatus at least to alter the video atlas to facilitate an efficient packing strategy.

In some embodiments, an apparatus can include means, such as processing circuitry and/or a memory device, for converting a volumetric video scene into a canonical representation. In some embodiments, an apparatus can include means for processing each frame of a plurality of frames of the canonical representation to yield a video atlas and corresponding metadata for the plurality of frames. In some embodiments, an apparatus can include means for determining, for a plurality of tiles of each frame of the plurality of frames, one or more tile characteristics. In some embodiments, an apparatus can include means for structuring the corresponding metadata to include information indicative of the one or more tile characteristics. In some embodiments, an apparatus can include means for altering the video atlas to facilitate an efficient packing strategy.

In some embodiments, a computer program product can include at least one non-transitory computer-readable storage medium having computer executable program code instructions stored therein. In some embodiments, the computer executable program code instructions can include program code instructions configured, upon execution, to convert a volumetric video scene into a canonical representation. In some embodiments, the computer executable program code instructions can include program code instructions configured, upon execution, to process each frame of a plurality of frames of the canonical representation to yield a video atlas and corresponding metadata for the plurality of frames. In some embodiments, the computer executable program code instructions can include program code instructions configured, upon execution, to determine, for a plurality of tiles of each frame of the plurality of frames, one or more tile characteristics. In some embodiments, the computer executable program code instructions can include program code instructions configured, upon execution, to structure the corresponding metadata to include information indicative of the one or more tile characteristics. In some embodiments, the computer executable program code instructions can include program code instructions configured, upon execution, to alter the video atlas to facilitate an efficient packing strategy.

In some embodiments, a method for compression of a volumetric video scene can include converting the volumetric video scene into a canonical representation, and processing separately each frame of a plurality of frames of the canonical representation to yield for each frame a video atlas and corresponding metadata. In some embodiments, the method for compression of the volumetric video scene can further include analyzing a plurality of tiles of each frame of the plurality of frames to identify two or more tiles having a tile characteristic that has a difference value that satisfies, such as by being below, a predetermined threshold and replacing the two or more tiles with static characteristic values in the corresponding metadata. In some embodiments, the method for compression of the volumetric video scene can further include, after amending the corresponding metadata, causing storage of the video atlas and the corresponding metadata separately as a video stream and a metadata stream, respectively and converting, at a specified internal processing resolution, each frame of the video stream into a 3D sample of a scene geometry. In some embodiments, the converting includes one of voxelizing a mesh model and down-sampling a high resolution point cloud. In some embodiments, the canonical representation can include a point cloud, a voxelized mesh model, a 360-video, a face-vertex mesh, a winged-edge mesh, a half-edge mesh, a quad-edge mesh, a corner-table mesh, or a vertex-vertex mesh. In some embodiments, the tile characteristic can be one of a color attribute, a depth attribute, a geometry attribute, a reflectance attribute, a roughness attribute, a transparency attribute, a metalness attribute, a specularity attribute, a surface normals attribute, a material attribute of the volumetric video scene, and the like.

In some embodiments, an apparatus for compression of a volumetric video scene can include at least one processor and at least one memory including computer program code for one or more programs. In some embodiments, the at least one memory and the computer program code can be configured to, with the at least one processor, cause the apparatus at least to convert the volumetric video scene into a canonical representation. In some embodiments, the at least one memory and the computer program code can be configured to, with the at least one processor, further cause the apparatus at least to process separately each frame of a plurality of frames of the canonical representation to yield for each frame a video atlas and corresponding metadata. In some embodiments, the at least one memory and the computer program code can be configured to, with the at least one processor, further cause the apparatus at least to analyze a plurality of tiles of each frame of the plurality of frames to identify two or more tiles having a tile characteristic that has a difference value that satisfies, such as by being below, a predetermined threshold. In some embodiments, the at least one memory and the computer program code can be configured to, with the at least one processor, further cause the apparatus at least to replace the two or more tiles with static characteristic values in the corresponding metadata. In some embodiments, the at least one memory and the computer program code can be configured to, with the at least one processor, further cause the apparatus at least to cause storage of the video atlas and the corresponding metadata separately as a video stream and a metadata stream, respectively. In some embodiments, the at least one memory and the computer program code can be configured to, with the at least one processor, further cause the apparatus at least to convert, at a specified internal processing resolution, each frame of the video stream into a 3D sample of a scene geometry.

In some embodiments, an apparatus for compression of a volumetric video scene can include means for converting the volumetric video scene into a canonical representation. In some embodiments, the apparatus can include means for processing separately each frame of a plurality of frames of the canonical representation to yield for each frame a video atlas and corresponding metadata. In some embodiments, the apparatus can include means for analyzing a plurality of tiles of each frame of the plurality of frames to identify two or more tiles having a tile characteristic that has a difference value that satisfies, such as by being below, a predetermined threshold. In some embodiments, the apparatus can include means for replacing the two or more tiles with static characteristic values in the corresponding metadata. In some embodiments, the apparatus can include means for causing storage of the video atlas and the corresponding metadata separately as a video stream and a metadata stream, respectively. In some embodiments, the apparatus can include means for converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions including program code instructions can be configured, upon execution, to convert the volumetric video scene into a canonical representation. In some embodiments, the at least one memory and the computer program code can be configured to, with the at least one processor, further cause the apparatus at least to process separately each frame of a plurality of frames of the canonical representation to yield for each frame a video atlas and corresponding metadata. In some embodiments, the at least one memory and the computer program code can be configured to, with the at least one processor, further cause the apparatus at least to analyze a plurality of tiles of each frame of the plurality of frames to identify two or more tiles having a tile characteristic that has a difference value that satisfies, such as by being below, a predetermined threshold. In some embodiments, the at least one memory and the computer program code can be configured to, with the at least one processor, further cause the apparatus at least to replace the two or more tiles with static characteristic values in the corresponding metadata. In some embodiments, the at least one memory and the computer program code can be configured to, with the at least one processor, further cause the apparatus at least to cause storage of the video atlas and the corresponding metadata separately as a video stream and a metadata stream, respectively. In some embodiments, the at least one memory and the computer program code can be configured to, with the at least one processor, further cause the apparatus at least to convert, at a specified internal processing resolution, each frame of the video stream into a 3D sample of a scene geometry.

In some embodiments, a method for compression of a volumetric video scene can include converting the volumetric video scene into a canonical representation, processing separately each frame of a plurality of frames of the canonical representation to yield for each frame a video atlas and corresponding metadata, and analyzing a plurality of tiles of each frame of the plurality of frames to identify two or more tiles having a tile characteristic that has a difference value that satisfies, such as by being below, a predetermined threshold. In some embodiments, the method can further include determining whether at least some of the two or more tiles can be merged to reduce the number of different tiles. In some embodiments, in an instance in which it is determined that at least two of the two or more tiles can be merged, the method can further include clipping at least a first tile from the video atlas and resetting the tile offsets for a second tile such that the reset tile offsets for the second tile correspond to a portion of the frame occupied by the first tile and the second tile. In some embodiments, the method can further include causing storage of the video atlas and the corresponding metadata separately as a video stream and a metadata stream, respectively and converting, at a specified internal processing resolution, each frame of the video stream into a 3D sample of a scene geometry.

In some embodiments, an apparatus for compression of a volumetric video scene can include at least one processor and at least one memory including computer program code for one or more programs. In some embodiments, the at least one memory and the computer program code can be configured to, with the at least one processor, cause the apparatus at least to convert the volumetric video scene into a canonical representation. In some embodiments, the at least one memory and the computer program code can be configured to, with the at least one processor, cause the apparatus at least to process separately each frame of a plurality of frames of the canonical representation to yield for each frame a video atlas and corresponding metadata. In some embodiments, the at least one memory and the computer program code can be configured to, with the at least one processor, cause the apparatus at least to analyze a plurality of tiles of each frame of the plurality of frames to identify two or more tiles having a tile characteristic that has a difference value that satisfies, such as by being below, a predetermined threshold. In some embodiments, the at least one memory and the computer program code can be configured to, with the at least one processor, cause the apparatus at least to determine whether at least some of the two or more tiles can be merged to reduce the number of different tiles. In some embodiments, in an instance in which it is determined that at least two of the two or more tiles can be merged, the at least one memory and the computer program code can be configured to, with the at least one processor, cause the apparatus at least to clip at least a first tile from the video atlas and reset the tile offsets for a second tile such that the reset tile offsets for the second tile correspond to a portion of the frame occupied by the first tile and the second tile. In some embodiments, the at least one memory and the computer program code can be configured to, with the at least one processor, cause the apparatus at least to cause storage of the video atlas and the corresponding metadata separately as a video stream and a metadata stream, respectively and convert, at a specified internal processing resolution, each frame of the video stream into a 3D sample of a scene geometry.

In some embodiments, an apparatus for compression of a volumetric video scene can include means for converting the volumetric video scene into a canonical representation. In some embodiments, an apparatus for compression of a volumetric video scene can include means for processing separately each frame of a plurality of frames of the canonical representation to yield for each frame a video atlas and corresponding metadata. In some embodiments, an apparatus for compression of a volumetric video scene can include means for analyzing a plurality of tiles of each frame of the plurality of frames to identify two or more tiles having a tile characteristic that has a difference value that satisfies, such as by being below, a predetermined threshold. In some embodiments, an apparatus for compression of a volumetric video scene can include means for determining whether at least some of the two or more tiles can be merged to reduce the number of different tiles. In some embodiments, in an instance in which it is determined that at least two of the two or more tiles can be merged, the apparatus can include means for clipping at least a first tile from the video atlas and reset the tile offsets for a second tile such that the reset tile offsets for the second tile correspond to a portion of the frame occupied by the first tile and the second tile. In some embodiments, an apparatus for compression of a volumetric video scene can include means for causing storage of the video atlas and the corresponding metadata separately as a video stream and a metadata stream, respectively and converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions comprising program code instructions can be configured, upon execution, to convert the volumetric video scene into a canonical representation. In some embodiments, the computer executable program code instructions comprising program code instructions can be configured, upon execution, to process separately each frame of a plurality of frames of the canonical representation to yield for each frame a video atlas and corresponding metadata. In some embodiments. the computer executable program code instructions comprising program code instructions can be configured, upon execution, to analyze a plurality of tiles of each frame of the plurality of frames to identify two or more tiles having a tile characteristic that has a difference value that satisfies, such as by being below, a predetermined threshold. In some embodiments, the computer executable program code instructions comprising program code instructions can be configured, upon execution, to determine whether at least some of the two or more tiles can be merged to reduce the number of different tiles. In some embodiments, in an instance in which it is determined that at least two of the two or more tiles can be merged, the computer executable program code instructions comprising program code instructions can be configured, upon execution, to clip at least a first tile from the video atlas and reset the tile offsets for a second tile such that the reset tile offsets for the second tile correspond to a portion of the frame occupied by the first tile and the second tile. In some embodiments, the computer executable program code instructions comprising program code instructions can be configured, upon execution, to cause storage of the video atlas and the corresponding metadata separately as a video stream and a metadata stream, respectively. In some embodiments, the computer executable program code instructions comprising program code instructions can be configured, upon execution, to convert, at a specified internal processing resolution, each frame of the video stream into a 3D sample of a scene geometry.

In some embodiments, a method for compression of a volumetric video scene can include converting the volumetric video scene into a canonical representation, processing separately each frame of a plurality of frames of the canonical representation to yield for each frame a video atlas and corresponding metadata, and determining, for a plurality of tiles of each frame of the plurality of frames, whether each tile of the plurality of tiles is a static tile or a dynamic tile. In some embodiments, the method for compression of the volumetric video scene can include flagging the static tiles in the metadata and causing storage of the static tiles from the video atlas, the dynamic tiles from the video atlas, and the corresponding metadata separately as a first video stream, a second video stream, and a metadata stream, respectively. In some embodiments, the method for compression of the volumetric video scene can include converting, at a specified internal processing resolution, each frame of the video stream into a 3D sample of a scene geometry.

In some embodiments, an apparatus for compression of a volumetric video scene can include at least one processor and at least one memory including computer program code for one or more programs. In some embodiments, the at least one memory and the computer program code configured to, with the at least one processor, cause the apparatus at least to convert the volumetric video scene into a canonical representation. In some embodiments, the at least one memory and the computer program code configured to, with the at least one processor, cause the apparatus at least to process separately each frame of a plurality of frames of the canonical representation to yield for each frame a video atlas and corresponding metadata. In some embodiments, the at least one memory and the computer program code configured to, with the at least one processor, cause the apparatus at least to determine, for a plurality of tiles of each frame of the plurality of frames, whether each tile of the plurality of tiles is a static tile or a dynamic tile. In some embodiments, the at least one memory and the computer program code configured to, with the at least one processor, cause the apparatus at least to flag the static tiles in the metadata. In some embodiments, the at least one memory and the computer program code configured to, with the at least one processor, cause the apparatus at least to cause storage of the static tiles from the video atlas, the dynamic tiles from the video atlas, and the corresponding metadata separately as a first video stream, a second video stream, and a metadata stream, respectively. In some embodiments, the at least one memory and the computer program code configured to, with the at least one processor, cause the apparatus at least to convert, at a specified internal processing resolution, each frame of the video stream into a 3D sample of a scene geometry.

In some embodiments, an apparatus for compression of a volumetric video scene can include means for converting the volumetric video scene into a canonical representation. In some embodiments, an apparatus for compression of a volumetric video scene can include means for processing separately each frame of a plurality of frames of the canonical representation to yield for each frame a video atlas and corresponding metadata. In some embodiments, an apparatus for compression of a volumetric video scene can include means for determining, for a plurality of tiles of each frame of the plurality of frames, whether each tile of the plurality of tiles is a static tile or a dynamic tile. In some embodiments, an apparatus for compression of a volumetric video scene can include means for flagging the static tiles in the metadata. In some embodiments, an apparatus for compression of a volumetric video scene can include means for causing storage of the static tiles from the video atlas, the dynamic tiles from the video atlas, and the corresponding metadata separately as a first video stream, a second video stream, and a metadata stream, respectively. In some embodiments, an apparatus for compression of a volumetric video scene can include means for converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions can include program code instructions configured, upon execution, to convert the volumetric video scene into a canonical representation. In some embodiments, the computer executable program code instructions can include program code instructions configured, upon execution, to process separately each frame of a plurality of frames of the canonical representation to yield for each frame a video atlas and corresponding metadata. In some embodiments, the computer executable program code instructions can include program code instructions configured, upon execution, to determine, for a plurality of tiles of each frame of the plurality of frames, whether each tile of the plurality of tiles is a static tile or a dynamic tile. In some embodiments, the computer executable program code instructions can include program code instructions configured, upon execution, to flag the static tiles in the metadata. In some embodiments, the computer executable program code instructions can include program code instructions configured, upon execution, to cause storage of the static tiles from the video atlas, the dynamic tiles from the video atlas, and the corresponding metadata separately as a first video stream, a second video stream, and a metadata stream, respectively. In some embodiments, the computer executable program code instructions can include program code instructions configured, upon execution, to convert, at a specified internal processing resolution, each frame of the video stream into a 3D sample of a scene geometry.

In some embodiments, a method for compression of a volumetric video scene can include converting the volumetric video scene into a canonical representation comprising a plurality of frames, each frame comprising a plurality of tiles, processing separately each of one or more frames of the plurality of frames of the canonical representation to yield for each frame a video atlas and corresponding metadata, and determining whether a tile of the plurality of tiles is a depth tile. In some embodiments, in an instance in which the tile of the plurality of tiles is determined to be a depth tile, the method for compression of the volumetric video scene can include determining whether the tile is a static tile or a dynamic tile. In some embodiments, in an instance in which the tile is a static tile, the method for compression of the volumetric video scene can include causing storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, the method for compression of the volumetric video scene can include causing storage of the video atlas and the corresponding metadata separately as a video stream and a metadata stream, respectively. In some embodiments, the method for compression of the volumetric video scene can include converting, at a specified internal processing resolution, each frame of the video stream into a 3D sample of a scene geometry.

In some embodiments, an apparatus for compression of a volumetric video scene can include at least one processor and at least one memory including computer program code for one or more programs. In some embodiments, the at least one memory and the computer program code can be configured to, with the at least one processor, cause the apparatus at least to convert the volumetric video scene into a canonical representation comprising a plurality of frames, each frame comprising a plurality of tiles. In some embodiments, the at least one memory and the computer program code can be configured to, with the at least one processor, cause the apparatus at least to process separately each of one or more frames of the plurality of frames of the canonical representation to yield for each frame a video atlas and corresponding metadata. In some embodiments, the at least one memory and the computer program code can be configured to, with the at least one processor, cause the apparatus at least to determine whether a tile of the plurality of tiles is a depth tile. In some embodiments, in an instance in which the tile of the plurality of tiles is determined to be a depth tile, the at least one memory and the computer program code can be configured to, with the at least one processor, cause the apparatus at least to determine whether the tile is a static tile or a dynamic tile. In some embodiments, in an instance in which the tile is a static tile, the at least one memory and the computer program code can be configured to, with the at least one processor, cause the apparatus at least to cause storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, the at least one memory and the computer program code can be configured to, with the at least one processor, cause the apparatus at least to cause storage of the video atlas and the corresponding metadata separately as a video stream and a metadata stream, respectively. In some embodiments, the at least one memory and the computer program code can be configured to, with the at least one processor, cause the apparatus at least to convert, at a specified internal processing resolution, each frame of the video stream into a 3D sample of a scene geometry.

In some embodiments, an apparatus for compression of a volumetric video scene can include means for converting the volumetric video scene into a canonical representation comprising a plurality of frames, each frame comprising a plurality of tiles. In some embodiments, an apparatus for compression of a volumetric video scene can include means for processing separately each of one or more frames of the plurality of frames of the canonical representation to yield for each frame a video atlas and corresponding metadata. In some embodiments, an apparatus for compression of a volumetric video scene can include means for determining whether a tile of the plurality of tiles is a depth tile. In some embodiments, in an instance in which the tile of the plurality of tiles is determined to be a depth tile, the apparatus can include means for determining whether the tile is a static tile or a dynamic tile. In some embodiments, in an instance in which the tile is a static tile, the apparatus can include means for causing storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, an apparatus for compression of a volumetric video scene can include means for causing storage of the video atlas and the corresponding metadata separately as a video stream and a metadata stream, respectively. In some embodiments, an apparatus for compression of a volumetric video scene can include means for converting, at a specified internal processing resolution, each frame of the video stream into a 3D sample of a scene geometry.

In some embodiments, a computer program product for compression of a volumetric video scene can include at least one non-transitory computer-readable storage medium having computer executable program code instructions stored therein. In some embodiments, the computer executable program code instructions comprising program code instructions can be configured, upon execution, to convert the volumetric video scene into a canonical representation comprising a plurality of frames, each frame comprising a plurality of tiles. In some embodiments, the computer executable program code instructions comprising program code instructions can be configured, upon execution, to process separately each of one or more frames of the plurality of frames of the canonical representation to yield for each frame a video atlas and corresponding metadata. In some embodiments, the computer executable program code instructions comprising program code instructions can be configured, upon execution, to determine whether a tile of the plurality of tiles is a depth tile. In some embodiments, in an instance in which the tile of the plurality of tiles is determined to be a depth tile, the computer executable program code instructions comprising program code instructions can be configured, upon execution, to determine whether the tile is a static tile or a dynamic tile. In some embodiments, in an instance in which the tile is a static tile, the computer executable program code instructions comprising program code instructions can be configured, upon execution, to cause storage of the depth tile portion of the frame as a mesh structure comprising one of a number of vertices with explicit topology, a regular grid of M×N vertices with implicit triangle strip topology, or a triangle fan originating at a corner of the depth tile. In some embodiments, the computer executable program code instructions comprising program code instructions can be configured, upon execution, to cause storage of the video atlas and the corresponding metadata separately as a video stream and a metadata stream, respectively. In some embodiments, the computer executable program code instructions comprising program code instructions can be configured, upon execution, to convert, at a specified internal processing resolution, each frame of the video stream into a 3D sample of a scene geometry.

In some embodiments, a method can be provided that comprises: separating one or more layouts based on a type for a plurality of volumetric video component atlases; determining one or more atlas characteristics of each of one or more volumetric video component atlases of the plurality of volumetric video component atlases; causing storage of information indicative of the one or more atlas characteristics of the one or more volumetric video component atlases as corresponding metadata; and determining one or more suitable packing strategies from among a plurality of packing strategies based on the one or more atlas characteristics, thereby indicating different volumetric video component types based on different layout types for the plurality of volumetric video component atlases. In some embodiments, the method can further comprise determining said one or more suitable packing strategies based on the type of volumetric video component, wherein different packing strategies are used for different volumetric video components, which results in video components having different patch layouts or different sizes. In some embodiments, the method can further comprise applying one of said one or more suitable packing strategies to a volumetric video component that represents depth or distance from camera of a patch of volumetric video, wherein the patch comprises a flat geometry surface without edges, where the patch is down-scaled or signaled otherwise, resulting in a reduction in a number of pixels used to represent the patch. In some embodiments, the method can further comprise applying one of said one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component. In some embodiments, the method can further comprise applying one of said one or more suitable packing strategies to a volumetric video component that utilizes intra or inter patch redundancy, interpolation or other non-visual compression method to reduce resolution or frequency of signaling, thereby using different of the one or more layouts between different compressed volumetric video components. In some embodiments, the method can further comprise converting, at a specified internal processing resolution, a volumetric video scene into a three dimensional (3D) sample of a scene geometry. In some embodiments, the method can further comprise voxelizing a mesh model of a volumetric video and down-sampling a high resolution canonical representation. In some embodiments, the method can further comprise providing a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, a material attribute or any visually compressed component of the volumetric video scene.

In some embodiments, an apparatus can be provided that comprises at least one processor and at least one memory including computer program code for one or more programs, the at least one memory and the computer program code configured to, with the at least one processor, cause the apparatus at least to: separate one or more layouts based on a type for a plurality of volumetric video component atlases; determine one or more atlas characteristics of each of one or more volumetric video component atlases of the plurality of volumetric video component atlases; cause storage of information indicative of the one or more atlas characteristics of the one or more volumetric video component atlases as corresponding metadata; and determine one or more suitable packing strategies from among a plurality of packing strategies based on the one or more atlas characteristics, thereby indicating different volumetric video component types based on different layout types for the plurality of volumetric video component atlases. In some embodiments, the at least one memory and the computer program code are further configured to, with the at least one processor, cause the apparatus at least to: determine said one or more suitable packing strategies based on the type of volumetric video component, wherein different packing strategies are used for different volumetric video components, which results in video components having different patch layouts or different sizes. In some embodiments, the at least one memory and the computer program code are further configured to, with the at least one processor, cause the apparatus at least to: apply one of said one or more suitable packing strategies to a volumetric video component that represents depth or distance from camera of a patch of volumetric video, wherein the patch comprises a flat geometry surface without edges, where the patch is down-scaled or signaled otherwise, resulting in a reduction in a number of pixels used to represent the patch. In some embodiments, the at least one memory and the computer program code are further configured to, with the at least one processor, cause the apparatus at least to: apply one of said one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component. In some embodiments, the at least one memory and the computer program code are further configured to, with the at least one processor, cause the apparatus at least to: apply one of said one or more suitable packing strategies to a volumetric video component that utilizes intra or inter patch redundancy, interpolation or other non-visual compression method to reduce resolution or frequency of signaling, thereby using different of the one or more layouts between different compressed volumetric video components. In some embodiments, the at least one memory and the computer program code are further configured to, with the at least one processor, cause the apparatus at least to: convert, at a specified internal processing resolution, a volumetric video scene into a three-dimensional (3D) sample of a scene geometry. In some embodiments, the at least one memory and the computer program code are further configured to, with the at least one processor, cause the apparatus at least to: voxelize a mesh model of a volumetric video and down-sampling a high-resolution canonical representation. In some embodiments, the at least one memory and the computer program code are further configured to, with the at least one processor, cause the apparatus at least to: provide a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, a material attribute or any visually compressed component of the volumetric video scene.

In some embodiments, an apparatus can be provided that comprises means, such as at least one processor and at least one memory including computer program code for one or more programs, for: separating one or more layouts based on a type for a plurality of volumetric video component atlases; means for determining one or more atlas characteristics of each of one or more volumetric video component atlases of the plurality of volumetric video component atlases; means for causing storage of information indicative of the one or more atlas characteristics of the one or more volumetric video component atlases as corresponding metadata; and means for determining one or more suitable packing strategies from among a plurality of packing strategies based on the one or more atlas characteristics, thereby indicating different volumetric video component types based on different layout types for the plurality of volumetric video component atlases. In some embodiments, the apparatus can further comprise means for determining said one or more suitable packing strategies based on the type of volumetric video component, wherein different packing strategies are used for different volumetric video components, which results in video components having different patch layouts or different sizes. In some embodiments, the apparatus can further comprise means for applying one of said one or more suitable packing strategies to a volumetric video component that represents depth or distance from camera of a patch of volumetric video, wherein the patch comprises a flat geometry surface without edges, where the patch is down-scaled or signaled otherwise, resulting in a reduction in a number of pixels used to represent the patch. In some embodiments, the apparatus can further comprise means for applying one of said one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component. In some embodiments, the apparatus can further comprise means for applying one of said one or more suitable packing strategies to a volumetric video component that utilizes intra or inter patch redundancy, interpolation or other non-visual compression method to reduce resolution or frequency of signaling, thereby using different of the one or more layouts between different compressed volumetric video components. In some embodiments, the apparatus can further comprise means for converting, at a specified internal processing resolution, a volumetric video scene into a three dimensional (3D) sample of a scene geometry. In some embodiments, the apparatus can further comprise means for voxelizing a mesh model of a volumetric video and down-sampling a high resolution canonical representation. In some embodiments, the apparatus can further comprise means for providing a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh. In some embodiments, the one or more atlas characteristics includes at least one of a color attribute, a geometry attribute, a reflectance attribute, a roughness attribute, a transparency attribute, a metalness attribute, a specularity attribute, a surface normals attribute, a material attribute or any visually compressed component of the volumetric video scene.

In some embodiments, a computer program product can be provided that comprises at least one non-transitory computer-readable storage medium having computer executable program code instructions stored therein, the computer executable program code instructions comprising program code instructions configured, upon execution, to: separate one or more layouts based on a type for a plurality of volumetric video component atlases; determine one or more atlas characteristics of each of one or more volumetric video component atlases of the plurality of volumetric video component atlases; cause storage of information indicative of the one or more atlas characteristics of the one or more volumetric video component atlases as corresponding metadata; and determine one or more suitable packing strategies from among a plurality of packing strategies based on the one or more atlas characteristics, thereby indicating different volumetric video component types based on different layout types for the plurality of volumetric video component atlases. In some embodiments, the computer executable program code instructions can further comprise program code instructions configured, upon execution, to: determine said one or more suitable packing strategies based on the type of volumetric video component, wherein different packing strategies are used for different volumetric video components, which results in video components having different patch layouts or different sizes; apply one of said one or more suitable packing strategies to a volumetric video component that represents depth or distance from camera of a patch of volumetric video, wherein the patch comprises a flat geometry surface without edges, where the patch is down-scaled or signaled otherwise, resulting in a reduction in a number of pixels used to represent the patch; apply one of said one or more suitable packing strategies to a volumetric video component that represents texture or color information of a surface within a patch of volumetric video, where similarities between patches is exploited to signal smaller patches inside larger patches, resulting in a reduction in a number of pixels used to represent the volumetric video component; apply one of said one or more suitable packing strategies to a volumetric video component that utilizes intra or inter patch redundancy, interpolation or other non-visual compression method to reduce resolution or frequency of signaling, thereby using different of the one or more layouts between different compressed volumetric video components; convert, at a specified internal processing resolution, a volumetric video scene into a three dimensional (3D) sample of a scene geometry; voxelize a mesh model of a volumetric video and down-sampling a high resolution canonical representation; or provide a canonical representation comprising one of a point cloud, a voxelized mesh model, a 360°-video, a face-vertex mesh, a winged-edge mesh, a half-edge mesh, a quad-edge mesh, a corner-table mesh, or a vertex-vertex mesh.

Some embodiments have been described above in relation to omnidirectional video and/or viewport adaptive streaming. It needs to be understood that embodiments generally apply to any type of video and/or generally to any type of video streaming.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving or generating a mesh model of volumetric video content comprising depth or texture information;
applying a patch layout to the mesh model based on the depth or texture information;
causing storage of metadata for respective patches of the patch layout, the metadata comprising the depth or texture information for respective patches of the patch layout;
determining one or more patches of the patch layout having similar or same depth or texture information by determining the one or more patches having depth or texture information differences less than, or less than or equal to a threshold;
determining at least one common static patch within two or more frames of a plurality of frames of the volumetric video content, based on the two or more frames having an attribute within a pre-defined variance of a second threshold;
removing at least one of the determined one or more patches and all except one instance of the at least one common patch within the two or more frames having an attribute within a pre-defined variance of the second threshold from the mesh model;
generating a differential depth map comprising depth details associated with the determined one or more patches removed from the mesh model; and providing the differential depth map and the mesh model.

2. The method according to claim 1, wherein determining one or more patches having similar or same depth or texture information comprises performing a pixel by pixel comparison.

3. The method according to claim 1, wherein the at least one of the determined one or more patches for which the metadata is removed fits inside at least one of the other of the one or more patches having the similar or same depth or texture information.

4. The method according to claim 1, further comprising: indicating in the metadata whether a respective patch is static or dynamic within a plurality of frames.

5. The method according to claim 1, further comprising: down-sampling a high resolution canonical representation.

6. The method according to claim 1, wherein the patch layout applied to the mesh model reflects at least one of: a number of vertices with explicit topology, a grid of M×N vertices with implicit triangle strip topology, or a triangle fan originating at one corner of a view.

7. An apparatus comprising at least one processor and at least one memory including computer program code, the at least one memory and the computer program code configured to, with the processor, cause the apparatus to at least: receive or generate a mesh model of volumetric video content comprising depth or texture information; apply a patch layout to the mesh model based on the depth or texture information; cause storage of metadata for respective patches of the patch layout, the metadata comprising the depth or texture information for respective patches of the patch layout; determine one or more patches of the patch layout having similar or same depth or texture information by determining the one or more patches having depth or texture information differences less than, or less than or equal to a threshold; determine at least one common static patch within two or more frames of a plurality of frames of the volumetric video content, based on the two or more frames having an attribute within a pre-defined variance of a second threshold;

remove at least one of the determined one or more patches and all except one instance of the at least one common patch within the two or more frames having an attribute within a pre-defined variance of the second threshold from the mesh model;

generate a differential depth map comprising depth details associated with the determined one or more patches removed from the mesh model; and provide the differential depth map and the mesh model.

8. The apparatus according to claim 7, wherein determining one or more patches having similar or same depth or texture information comprises performing a pixel by pixel comparison.

9. The apparatus according to claim 7, wherein the at least one of the determined one or more patches for which the metadata is removed fits inside at least one of the other of the one or more patches having the similar or same depth or texture information.

10. The apparatus according to claim 7, wherein the at least one memory and the computer program code are further configured to, with the processor, cause the apparatus to at least: indicate in the metadata whether a respective patch is static or dynamic within a plurality of frames.

11. The apparatus according to claim 7, wherein the at least one memory and the computer program code are further configured to, with the processor, cause the apparatus to at least: down-sample a high resolution canonical representation.

12. The apparatus according to claim 7, wherein the patch layout applied to the mesh model reflects at least one of: a number of vertices with explicit topology, a grid of M×N vertices with implicit triangle strip topology, or a triangle fan originating at one corner of a view.

13. A computer program product comprising at least one non-transitory computer-readable storage medium having computer-executable program code instructions stored therein, the computer-executable program code instructions comprising program code instructions to: receive or generate a mesh model of volumetric video content comprising depth or texture information; apply a patch layout to the mesh model based on the depth or texture information; cause storage of metadata for respective patches of the patch layout, the metadata comprising the depth or texture information for respective patches of the patch layout; determine one or more patches of the patch layout having similar or same depth or texture information by determining the one or more patches having depth or texture information differences less than, or less than or equal to a threshold; determine at least one common static patch within two or more frames of a plurality of frames of the volumetric video content, based on the two or more frames having an attribute within a pre-defined variance of a second threshold;

remove at least one of the determined one or more patches and all except one instance of the at least one common patch within the two or more frames having an attribute within a pre-defined variance of the second threshold from the mesh model;

generate a differential depth map comprising depth details associated with the determined one or more patches removed from the mesh model; and provide the differential depth map and the mesh model.

14. The computer program product according to claim 13, wherein determining one or more patches having similar or same depth or texture information comprises performing a pixel by pixel comparison.

15. The computer program product according to claim 13, wherein the at least one of the determined one or more patches for which the metadata is removed fits inside at least one of the other of the one or more patches having the similar or same depth or texture information.

16. The computer program product according to claim 13, wherein the computer-executable program code instructions further comprise program code instructions to: indicate in the metadata whether a respective patch is static or dynamic within a plurality of frames.

17. The computer program product according to claim 13, wherein the computer-executable program code instructions further comprise program code instructions to: down-sample a high resolution canonical representation.

\* \* \* \* \*